US011913658B2

(12) United States Patent
Chu et al.

(10) Patent No.: US 11,913,658 B2
(45) Date of Patent: Feb. 27, 2024

(54) AIR PURIFIER

(71) Applicant: Samsung Electronics Co., Ltd., Suwon-si (KR)

(72) Inventors: Euysung Chu, Suwon-si (KR); Byungghun Kim, Suwon-si (KR); Wooseog Song, Suwon-si (KR); Taeyong Lee, Suwon-si (KR); Youngseok Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 287 days.

(21) Appl. No.: 17/134,882

(22) Filed: Dec. 28, 2020

(65) Prior Publication Data
US 2021/0199323 A1 Jul. 1, 2021

(30) Foreign Application Priority Data
Dec. 27, 2019 (KR) .......................... 10-2019-0175829

(51) Int. Cl.
*F24F 11/34* (2018.01)
*F24F 11/88* (2018.01)
(Continued)

(52) U.S. Cl.
CPC .............. *F24F 11/34* (2018.01); *F24F 11/88* (2018.01); *F24F 13/10* (2013.01); *F24F 13/20* (2013.01);
(Continued)

(58) Field of Classification Search
CPC .. F24F 11/34; F24F 11/88; F24F 13/10; F24F 13/20; F24F 2110/80; F24F 2110/40;
(Continued)

(56) References Cited

U.S. PATENT DOCUMENTS

2018/0306455 A1* 10/2018 Kelly
2018/0328605 A1* 11/2018 Bae
2019/0184324 A1*  6/2019 Lee

FOREIGN PATENT DOCUMENTS

CN         107477695 A  * 12/2017
CN         108507036 A  *  9/2018
(Continued)

OTHER PUBLICATIONS

English Translation of KR-20180080405-A, dated Dec. 1, 2022 (Year: 2022).*

(Continued)

*Primary Examiner* — Edelmira Bosques
*Assistant Examiner* — Brett Peterson Mallon
(74) *Attorney, Agent, or Firm* — STAAS & HALSEY LLP

(57) ABSTRACT

An air purifier includes a main body having an inlet and a discharge device mounted on the main body and configured to receive air introduced into the main body through the inlet and discharge the air from the air purifier, wherein the discharge device includes a discharge opening, an opening and closing member including a portion having a size and shape corresponding to the discharge opening, and configured to move out of the discharge opening and into the discharge opening to open and close the discharge opening, and a discharge portion including a plurality of discharge holes, wherein each discharge hole of the plurality of discharge holes has a size smaller than a size of the discharge opening, and wherein the discharge portion has an air discharging area that is variable.

19 Claims, 17 Drawing Sheets

(51) Int. Cl.
*F24F 13/10* (2006.01)
*F24F 13/20* (2006.01)
*F24F 110/10* (2018.01)
*F24F 110/40* (2018.01)
*F24F 110/65* (2018.01)
*F24F 110/80* (2018.01)

(52) U.S. Cl.
CPC ....... *F24F 2110/10* (2018.01); *F24F 2110/40* (2018.01); *F24F 2110/65* (2018.01); *F24F 2110/80* (2018.01)

(58) Field of Classification Search
CPC ...... F24F 2110/10; F24F 2110/65; F24F 8/80; F24F 13/12; F24F 1/0071; F24F 1/0328; F24F 3/16
See application file for complete search history.

(56) References Cited

FOREIGN PATENT DOCUMENTS

| | | |
|---|---|---|
| JP | 2013-13852 | 1/2013 |
| JP | 2013-217580 A | 10/2013 |
| JP | 2016-165682 | 9/2016 |
| KR | 10-2006-0023457 | 3/2006 |
| KR | 10-2011-0041692 | 4/2011 |
| KR | 10-2015-0047371 | 5/2015 |
| KR | 10-1611313 | 4/2016 |
| KR | 10-2017-0002728 A | 1/2017 |
| KR | 20170002728 A * | 1/2017 |
| KR | 10-2017-0011942 | 2/2017 |
| KR | 10-1778544 | 9/2017 |
| KR | 10-2018-0080405 A | 7/2018 |
| KR | 20180080405 A * | 7/2018 |
| KR | 101897353 B1 * | 10/2018 |
| KR | 10-1921274 | 2/2019 |
| KR | 10-2019-0072368 | 6/2019 |
| WO | 2019/117523 | 6/2019 |

OTHER PUBLICATIONS

English Translation of KR-20170002728-A, dated Dec. 1, 2022 (Year: 2022).*
English Translation of KR-101897353-B1, dated Dec. 1, 2022 (Year: 2022).*
English Translation of CN-108507036-A, dated Dec. 1, 2022 (Year: 2022).*
English Translation of CN-107477695-A, dated May 24, 2023 (Year: 2023).*
Internationai Search Report dated Apr. 13, 2021 from International Application No. PCT/KR2020/018670.

* cited by examiner

AIR PURIFIER

CROSS-REFERENCE TO RELATED APPLICATIONS

This application is based on and claims priority under 35 U.S.C. § 119 to Korean Patent Application No. 10-2019-0175829, filed on Dec. 27, 2019 in the Korean Intellectual Property Office, the disclosure of which is incorporated herein by reference.

BACKGROUND

1. Field

The disclosure relates to an air purifier, and more specifically, to an air purifier capable of discharging air in various ways.

2. Description of the Related Art

An air purifier is a device used to remove pollutants from air. The air purifier may remove bacteria, viruses, mold, fine dust, and chemicals that cause odors in the admitted air.

The air purifier may be provided with a filter for purifying contaminated indoor air. Air admitted into the air purifier passes through the filter and pollutants are removed so that the air is purified to be in a clean state, and the purified air may be discharged to the outside of the air purifier.

The air purifier may adjust the speed of rotations of a fan to control the amount of air being purified and discharged. When the speed of rotations of the fan increases, the air purifier may purify and discharge a larger amount of air, and when the speed of rotations of the fan decreases, the air purifier may purify and discharge a smaller amount of air.

The air purifier may include an outlet for discharging the purified air. The location of the outlet may be determined in consideration of the location of an inlet. The outlet may be formed on one of the top, front, rear, left and right sides of the air purifier.

SUMMARY

Therefore, it is an object of the disclosure to provide an air purifier capable of discharging purified air in various directions.

It is another object of the disclosure to provide an air purifier capable of adjusting an area for discharging purified air.

Additional aspects of the disclosure will be set forth in part in the description which follows and, in part, will be obvious from the description, or may be learned by practice of the disclosure.

According to an aspect of the disclosure, there is provided an air purifier including: a main body having an inlet; and a discharge device mounted on the main body and configured to receive air introduced into the main body through the inlet and discharge the air from the air purifier, wherein the discharge device includes: a discharge opening; an opening and closing member including a portion having a size and shape corresponding to the discharge opening, and configured to move out of the discharge opening and into the discharge opening to open and close the discharge opening; and a discharge portion including a plurality of discharge holes, wherein each discharge hole of the plurality of discharge holes has a size smaller than a size of the discharge opening, and wherein the discharge portion has an air discharging area that is variable.

The discharge device may include: a first case fixed to the main body; and a second case provided to be movable with respect to the first case.

The air discharging area of the discharge portion may be varied as the second case is moved with respect to the first case.

The discharge device may include a first driving device configured to move the second case with respect to the first case.

The discharge device may further include a third case provided to be movable with respect to the second case.

The discharge device may further include a second driving device configured to move the third case with respect to the second case.

The discharge opening may be provided at an upper side of the discharge device, and the discharge portion may be provided at a lateral side of the discharge device.

The discharge device may include an opening and closing driving device configured to move the opening and closing member out of the discharge opening and into the discharge opening to open and close the discharge opening.

The air purifier may further include: a sensor; and a controller configured to receive a signal from the sensor and, based on the received signal, control a movement of the second case with respect to the first case and a movement of the opening and closing member with respect to the discharge opening.

The sensor may be configured to measure a temperature, and the controller may be further configured to: in response to the temperature measured by the sensor being lower than or equal to a predetermined value, control the second case to move in a direction away from the main body; and in response to the temperature measured by the sensor being higher than the predetermined value, control the second case to move in a direction toward the main body.

The sensor may be configured to measure an illuminance, and the controller may be further configured to: in response to the illuminance measured by the sensor being higher than a predetermined value, control the second case to move in a direction away from the main body; and in response to the illuminance measured by the sensor being lower than or equal to the predetermined value, control the second case to move in a direction toward the main body.

The sensor may be configured to measure a current consumption, and the controller may be further configured to; in response to the current consumption measured by the sensor being higher than a predetermined value, control the second case to move in a direction away from the main body; and in response to the current consumption measured by the sensor being lower than or equal to the predetermined value, control the opening and closing member to move in a direction that the discharge opening is opened.

The sensor may include an infrared sensor configured to detect a subject, and the controller may be further configured to: in response to the subject detected by the infrared sensor being smaller than or equal to a predetermined size, control the second case to move in a direction away from the main body; and in response to the subject detected by the infrared sensor being larger than the predetermined value, control the second case to move in a direction that the discharge opening is opened.

The sensor may be configured to measure an amount of carbon dioxide, and the controller may be further configured to: in response to the amount of the carbon dioxide measured by the sensor being greater than a predetermined value, control the opening and closing member to move in a direction that the discharge opening is opened, and in response to the amount of the carbon dioxide measured by the sensor being less than or equal to the predetermined value, control the opening and closing member to move in a direction that the discharge opening is closed.

The sensor may be configured to measure a concentration of smoke from fire, and the controller may be further configured to: in response to the concentration of smoke measured by the sensor being higher than a predetermined value, control the opening and closing member to move in a direction that the discharge opening is closed, and in response to the concentration of smoke measured by the sensor being lower than or equal to the predetermined value, control the opening and closing member to move in a direction that the discharge opening is opened.

According to another aspect of the disclosure, there is provided an air purifier including: a main body having an inlet; and a discharge device mounted on the main body and configured to receive air introduced into the main body through the inlet and discharge the air from the air purifier, wherein the discharge device includes: a discharge opening located at an upper side of the discharge device; a first case fixed to the main body and having a first discharge portion including a first plurality of discharge holes, wherein each discharge hole of the first plurality of discharge holes has a size smaller than a size of the discharge opening; a second case provided to be movable with respect to the first case, and having a second discharge portion including a second plurality of discharge holes, wherein each discharge hole of the first plurality of discharge holes has a size smaller than the size of the discharge opening; and an opening and closing member including a portion having a size and shape corresponding to the discharge opening, and configured to move out of the discharge opening and into the discharge opening to open and close the discharge opening, wherein the discharge device has an air discharging area that increases as the second case moves in a direction away from the first case, and decreases as the second case moves in a direction toward the first case.

The second discharge portion may be provided at a lateral side of the discharge device.

The air purifier may further include a controller configured to control a movement of the second case in relation to the first case and a movement of the opening and closing member out of the discharge opening and into the discharge opening.

The air purifier may further include a sensor configured to measure a pressure, and the controller may be further configured to: in response to the pressure measured by the sensor being higher than a predetermined value, control the opening and closing member to move in a direction that the discharge opening is closed; and in response to the pressure measured by the sensor being lower than or equal to the predetermined value, control the opening and closing member to move in a direction that the discharge opening is opened.

The air purifier may further include a sensor configured to measure an amount of dust, and the controller may be further configured to: in response to the amount of dust measured by the sensor being greater than a predetermined value, control the opening and closing member to move in a direction that the discharge opening is opened, and in response to the amount of dust measured by the sensor being less than or equal to the predetermined value, control the opening and closing member to move in a direction that the discharge opening is closed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Like reference numbers or signs in the various drawings of the application represent parts or components that perform substantially the same functions.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

For the sake of convenience in description, the following is described in relation to an air purifier as example, but the configuration of the discharge device having a variable air discharging area according to embodiment of the disclosure is not limited to the air purifier, and may be applied to various home appliance as long as it can be configured to discharge air, such as an air conditioner.

Hereinafter, embodiments of the disclosure will be described in detail with reference to the accompanying drawings.

Figure 1:
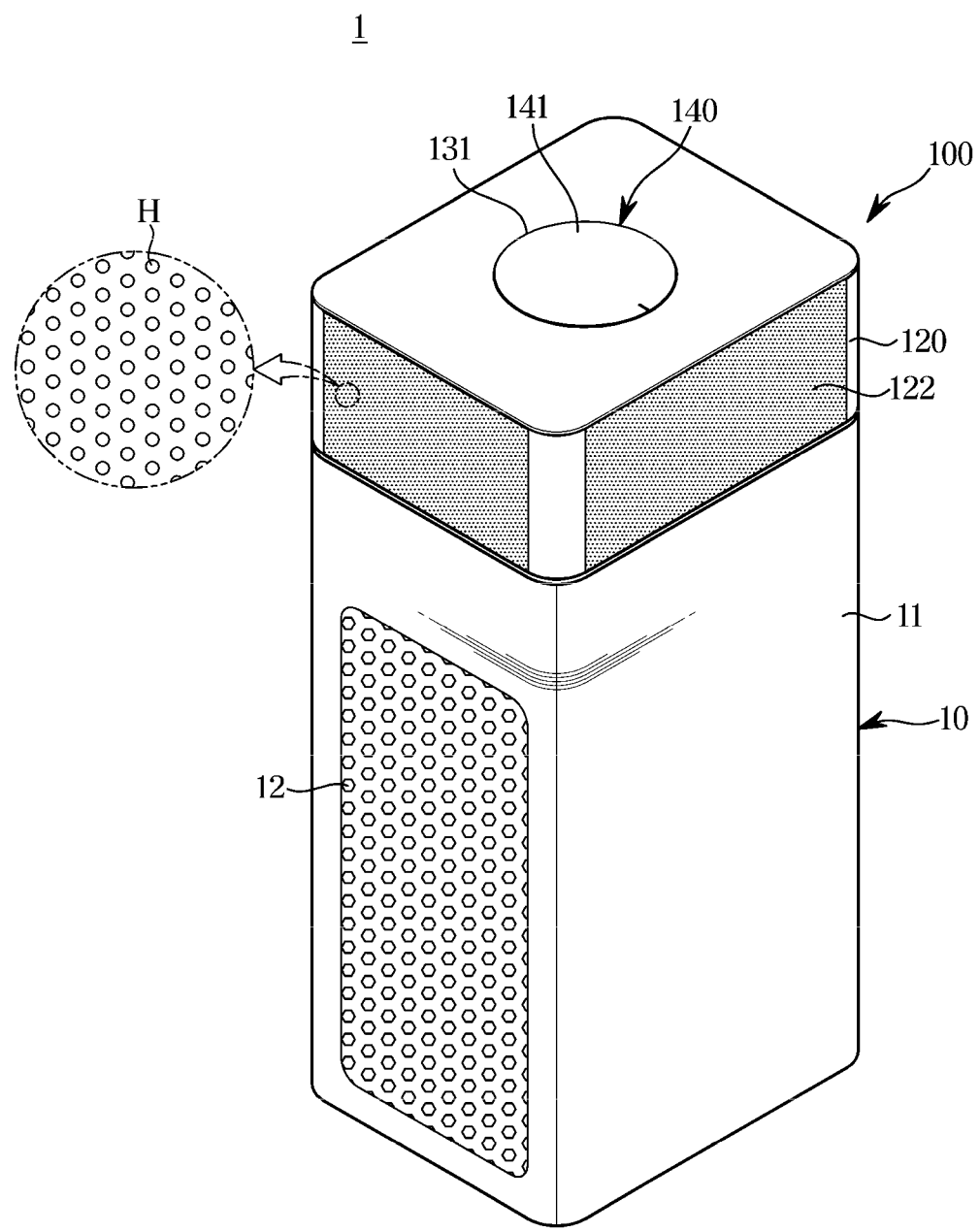
FIG. 1 is a view illustrating an air purifier according to an embodiment of the disclosure.
Figure 2:
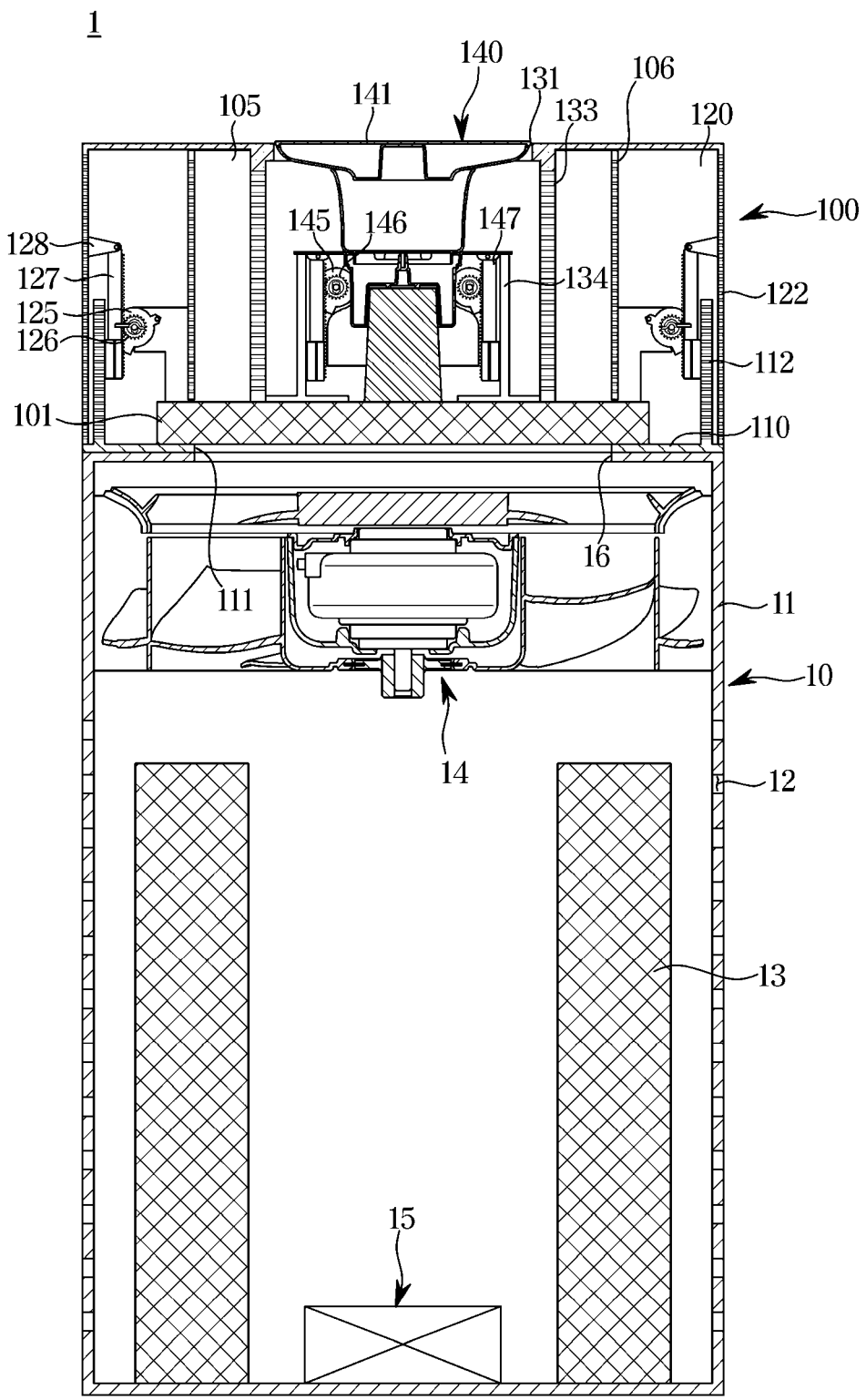
FIG. 2 is a view illustrating a cross-section of the air purifier shown in FIG. 1.
Figure 3:
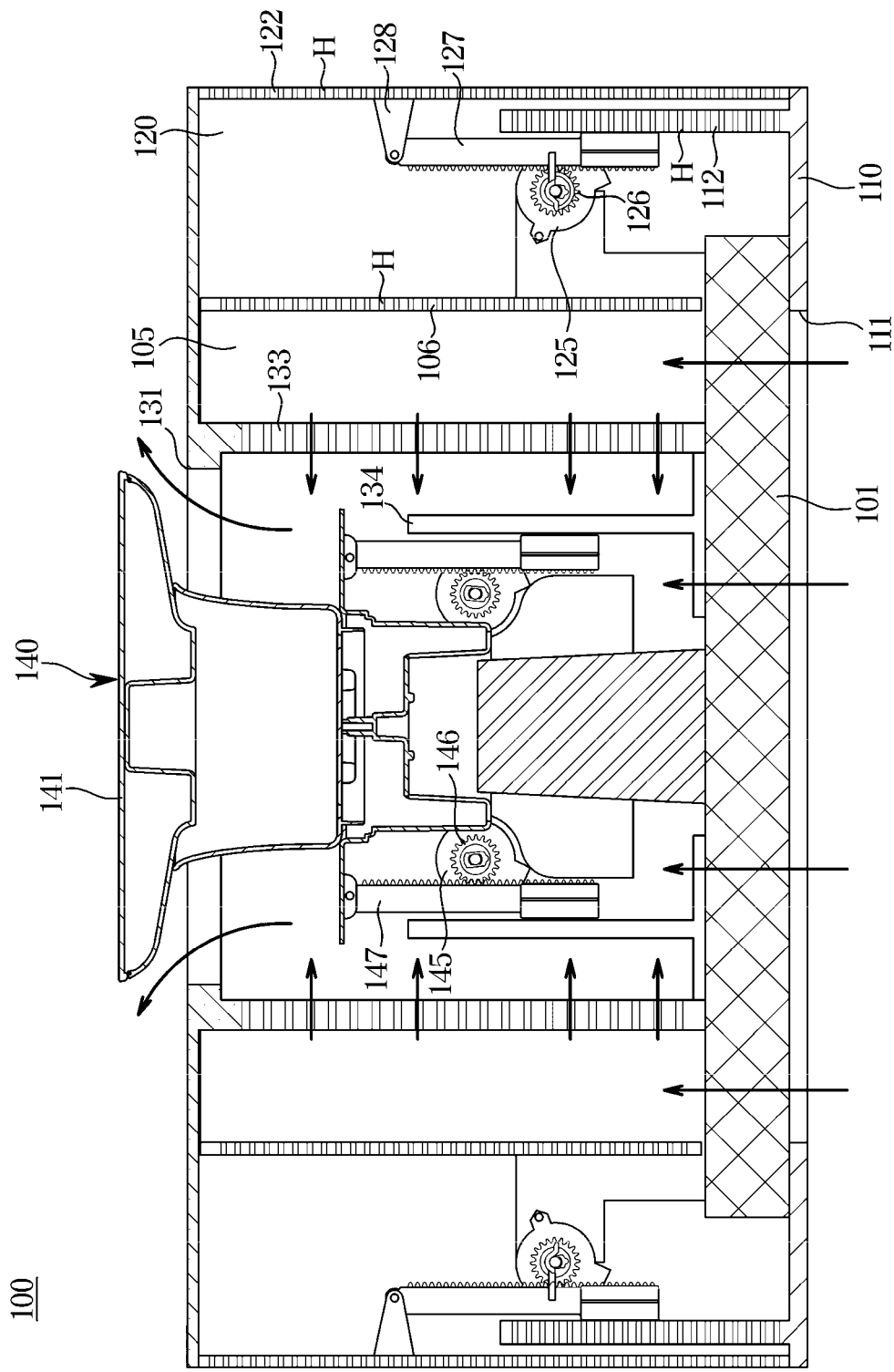
FIG. 3 is a cross-sectional view illustrating a state in which the air purifier shown in FIG. 1 operates in the first mode.

FIG. 1 is a view illustrating an air purifier according to an embodiment of the disclosure. FIG. 2 is a view illustrating a cross-section of the air purifier shown in FIG. 1. FIG. 3 is a cross-sectional view illustrating a state in which the air purifier shown in FIG. 1 operates in a first mode.

Referring to FIGS. 1 to 3, an air purifier 1 may include a main body 10 and a discharge device 100 mounted on the main body 10.

The main body 10 may include a housing 11. The housing 11 may have a box shape. The housing 11 may form a part of the external appearance of the air purifier 1. Components for driving the air purifier 1 may be accommodated in the housing 11.

The housing 11 may be formed with an inlet 12. The inlet 12 may be formed on at least one side of the housing 11. In FIG. 2, the inlets 12 are illustrated on both sides of the housing 11, but the position where the inlet 12 is formed is not limited thereto, and may be formed on all four sides of the housing 11, or may be formed only on one side of the housing 11.

The housing 11 may have a main body filter 13 disposed therein. The main body filter 13 may be disposed to filter air introduced through the inlet 12. The main body filter 13 may be disposed adjacent to the inlet 12. The main body filter 13 may be disposed to face an inner surface of the housing 11 on which the inlet 12 is formed. The main body filter 13 may be provided to correspond to the surface of the housing 11 on which the inlet 12 is formed.

The housing 11 may have a blowing device 14 disposed therein. The blowing device 14 may be provided to suck the external air of the housing 11 through the inlet 12 and blow the sucked external air to the discharge device 100.

The housing 11 has a controller 15 disposed therein. The controller 15 may be configured to control the operation of the air purifier 1 by receiving a command from an inputter (not shown).

The housing 11 is provided with a main body connector 16 formed at a portion of the housing 11 facing the discharge device 100. Air blown from the blowing device 14 through the main body connector 16 may be moved to the discharge device 100.

The discharge device 100 may be mounted on an upper side of the main body 10. The discharge device 100 may be provided to communicate with the main body 10. The discharge device 100 may be provided to discharge air blown from the main body 10 to the outside of the air purifier 1. The discharge device 100 may include a discharge opening 131 and discharge portions 112 and 122. The discharge portions 112 and 122 may include a plurality of discharge holes H having a fine size that allow air to be discharged at a low speed so that a user is prevented from feeling discomfort due to the discharged air.

The discharge device 100 includes a first case 110 fixed to the main body 10, a second case 120 provided to be movable with respect to the first case 110, and an opening and closing device 140 provided to be movable with respect to the second case 120.

The first case 110 may form a bottom surface of the discharge device 100, and a part of the first case 110 may be located inside the second case 120. The second case 120 may form a side surface and an upper surface of the discharge device 100.

The first case 110 may include a device connector 111 for communicating with the main body 10. The device connector 111 may be connected to the main body connector 16 of the main body 10.

The first case 110 may be provided with a device filter 101 mounted thereon. The device filter 101 may be arranged to filter air introduced into the discharge device 100 through the main body connector 16. The main body filter 13 may primarily filter air introduced into the air purifier 1, and the device filter 101 may secondarily filter air that has passed through the blowing device 14.

The first case 110 may include a first discharge portion 112. The first discharge portion 112 may be provided to discharge air when the air purifier 1 operates in the third mode. The first discharge portion 112 may include a plurality of discharge holes H having a fine size. The first discharge portion 112 may be provided to face a lateral side. The first discharge portion 112 may be formed on all of the front, rear, left and right sides of the first case 110. The first discharge unit 112 may be exposed to the outside according to the mode of the air purifier 1.

The discharge device 100 may include a fixed case 105. The fixing case 105 may be fixed to the first case 110. The fixed case 105 may include a first passage portion 106.

The first passage portion 106 may be provided to pass air introduced into the discharge device 100 and discharged through the discharge portions 112 and 122. The first passage portion 106 may include a plurality of holes.

The second case 120 may be provided to be movable with respect to the first case 110. The second case 120 may include a second discharge portion 122.

The second discharge portion 122 may include a plurality of discharge holes H having a fine size. The second discharge portion 122 may be provided to discharge air when the air purifier 1 operates in the second mode and the third mode. The second discharge portion 122 may be provided to face the lateral side of the air purifier 1. The second discharge portion 122 may be formed on all of the front, rear, left, and right sides of the second case 120.

The discharge device 100 may include first driving devices 125, 126, 127, and 128 for driving the second case 120. The first driving devices 125, 126, 127, and 128 may include a first driving source 125, a first pinion 126, a first rack 127, and a first fixing part 128. The first driving devices 125, 126, 127, and 128 may be provided in plural.

The first driving source 125 may be fixed to the fixed case 105. The first pinion 126 may be connected to the first driving source 125. The first pinion 126 may receive power from the first driving source 125. The first rack 127 may receive power from the first pinion 127. The first rack 127 may be fixed to the first fixing part 128. The first fixing part 128 may be fixed to the second case 120. With such a configuration, the second case 120 may be moved based on the driving of the first driving source 125.

The discharge opening 131 may be disposed in a part of the second case 120 forming the upper surface of the air purifier 1. The discharge opening 131 may be provided to discharge air when the air purifier 1 operates in the first mode. The discharge opening 131 may be opened and closed by the opening and closing device 140.

A second passage portion 133 may be located inside the first passage portion 106. The second passage portion 133 may be provided to pass air introduced into the discharge device 100 and discharged through the discharge opening 131. The second passage portion 133 may include a plurality of holes.

The opening and closing device 140 may be provided to open and close the discharge opening 131. The opening and closing device 140 may include an opening and closing member 141. A portion of the opening and closing member 141 may be provided in a size and shape corresponding to the discharge opening 131.

The opening and closing device 140 may include opening and closing driving device 145, 146, and 147 for driving the opening and closing member 141. The opening and closing driving device 145, 146, and 147 may include an opening and closing driving source 145, an opening and closing pinion 146, and an opening and closing rack 147. The opening and closing driving devices 145, 146, and 147 may be provided in plural.

The opening and closing driving source 145 may be fixed to the second case 120. The opening and closing pinion 146 may be connected to the opening and closing driving source 145. The opening and closing pinion 146 may receive power from the opening and closing driving source 145. The opening and closing rack 147 may receive power from the opening and closing pinion 147. The opening and closing rack 147 may be guided to move by a device guide 134 provided in the second case 120. The device guide 134 may guide the movement of the opening and closing rack 147 in the vertical direction. With such configuration, the opening and closing member 141 may move between a position where the discharge opening 131 is opened and a position where the discharge opening 131 is closed based on the driving of the opening and closing driving source 145.

Figure 4:
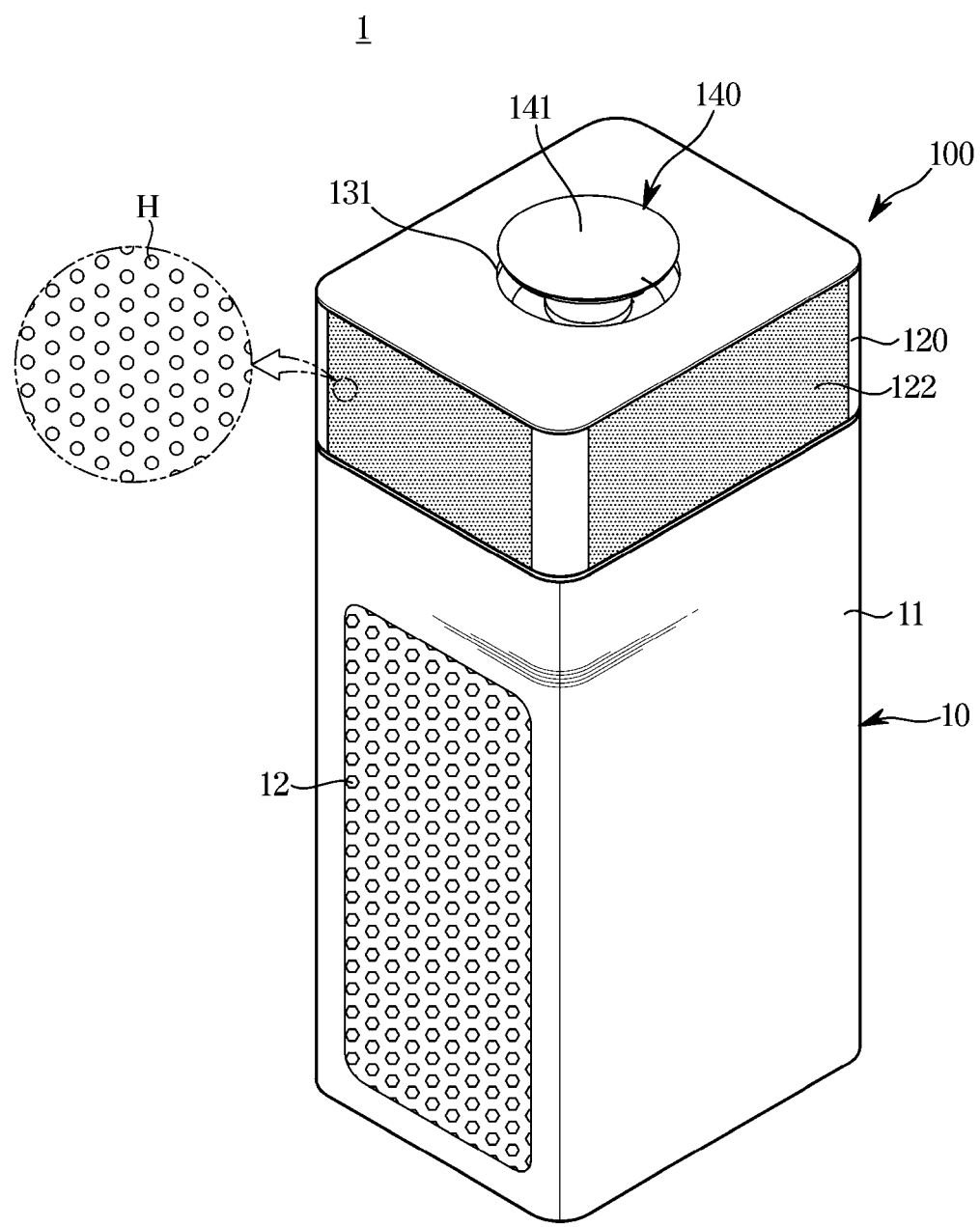
FIG. 4 is a perspective view illustrating the air purifier shown in FIG. 3.
Figure 5:
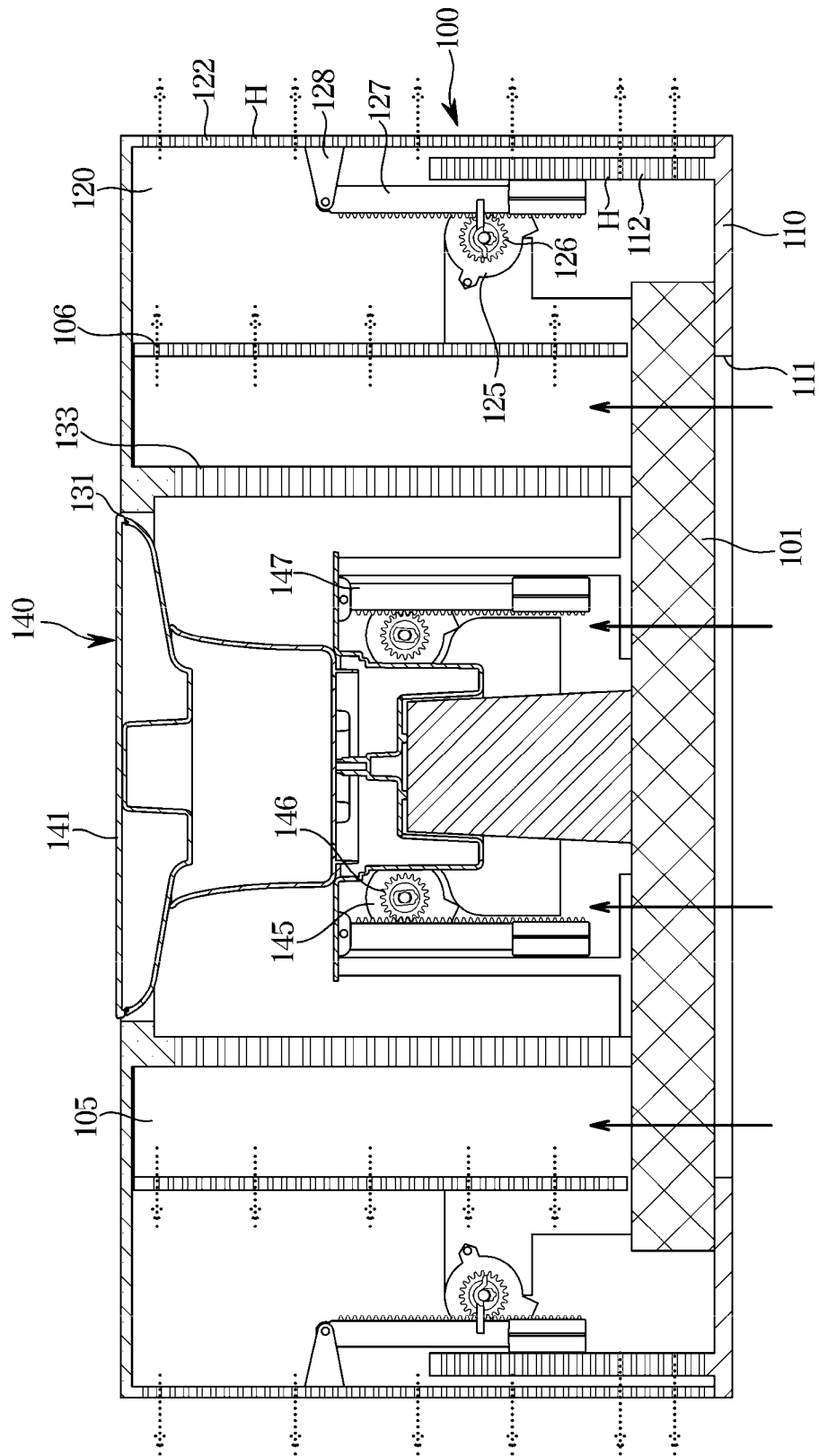
FIG. 5 is a cross-sectional view illustrating a state in which the air purifier shown in FIG. 1 operates in the second mode.
Figure 6:
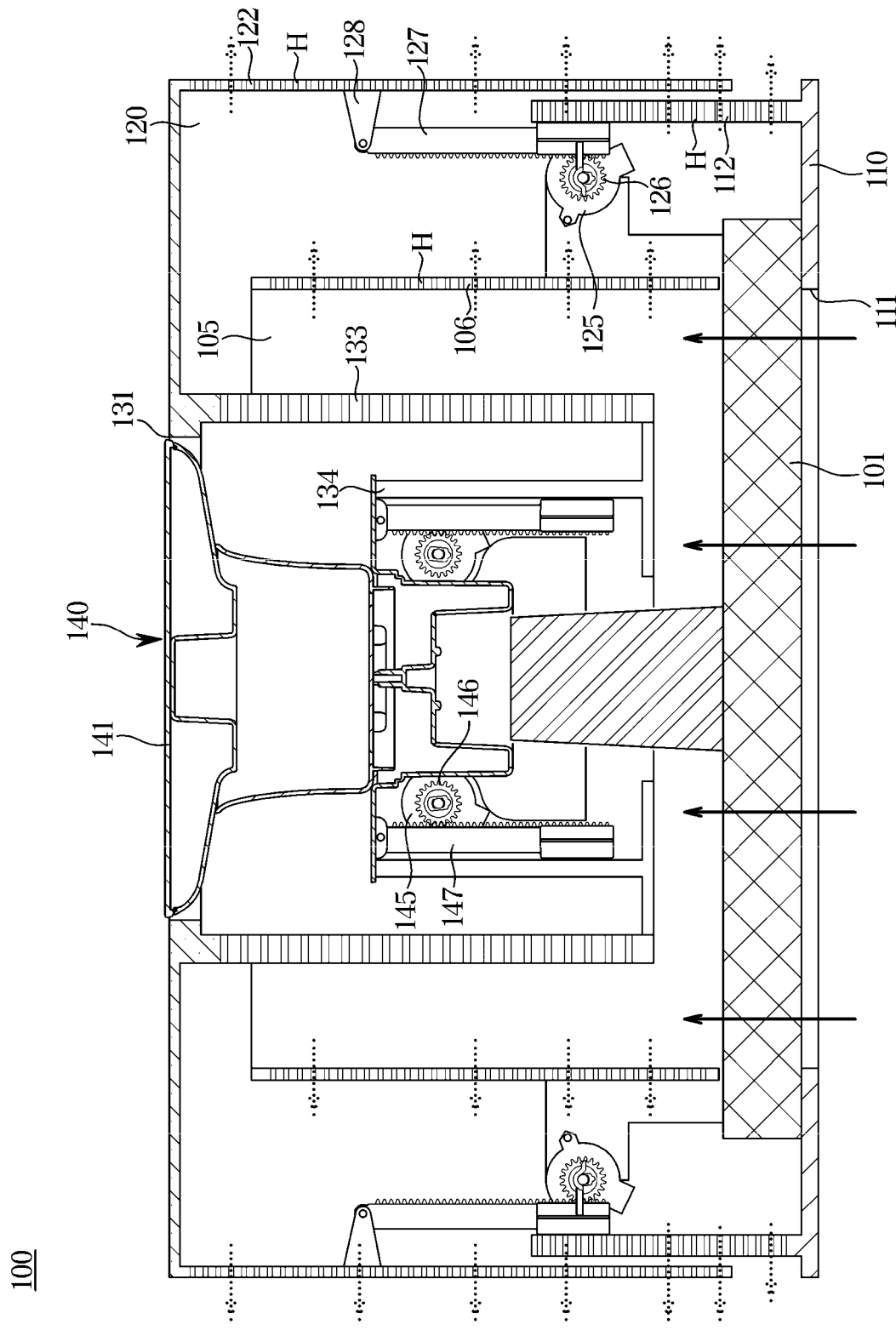
FIG. 6 is a cross-sectional view illustrating a state in which the air purifier shown in FIG. 1 operates in the third mode.
Figure 7:
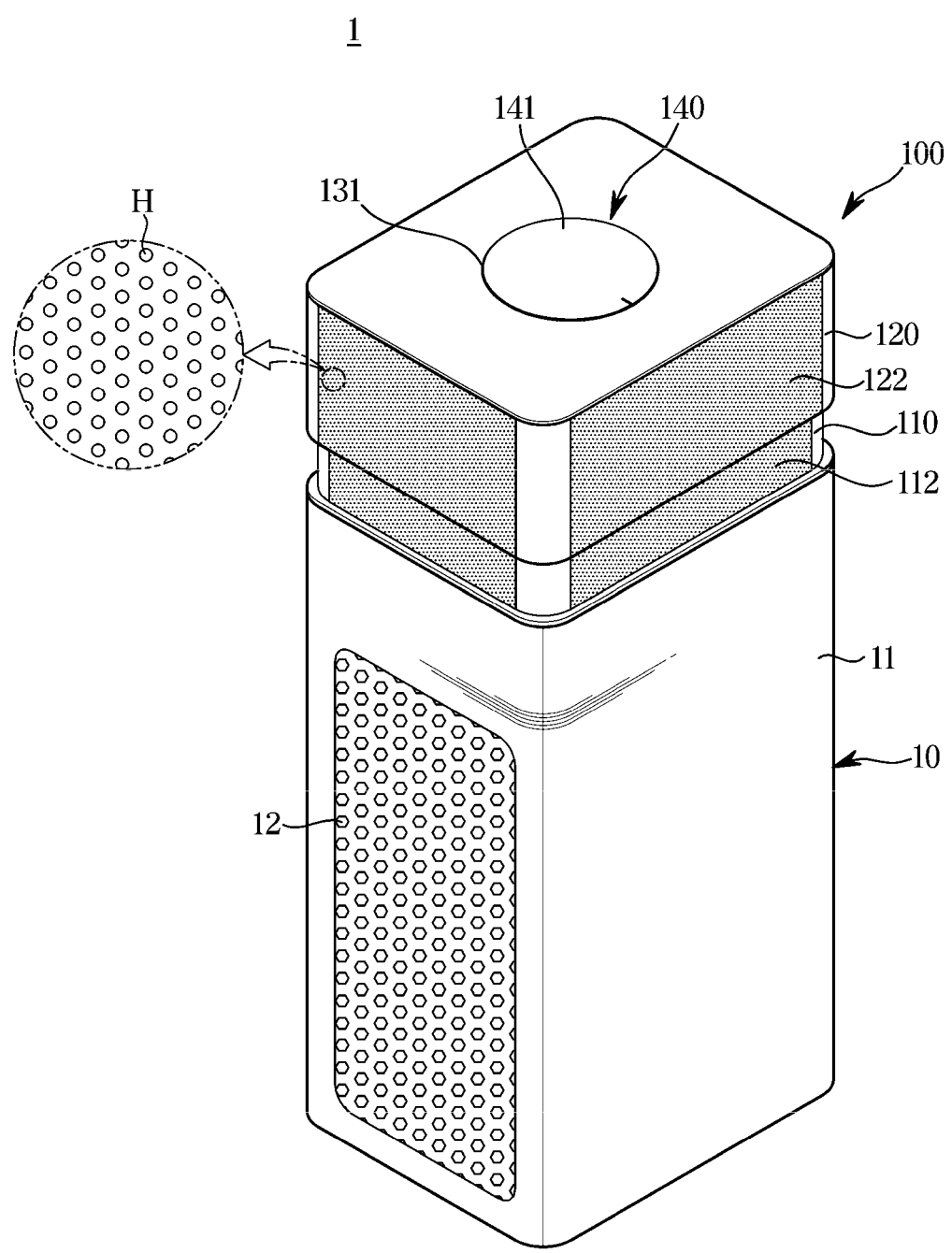
FIG. 7 is a perspective view illustrating the air purifier shown in FIG. 6.

FIG. 4 is a perspective view illustrating the air purifier shown in FIG. 3. FIG. 5 is a cross-sectional view illustrating a state in which the air purifier shown in FIG. 1 operates in a second mode. FIG. 6 is a cross-sectional view illustrating a state in which the air purifier shown in FIG. 1 operates in a third mode. FIG. 7 is a perspective view illustrating the air purifier shown in FIG. 6.

The operation of the air purifier 1 will be described with reference to FIGS. 1 to 7.

Referring to FIGS. 3 and 4, the air purifier 1 may operate in the first mode in which purified air is discharged through the discharge opening 131.

In detail, the controller 15, in response to receiving a command for operating the air purifier 1 in the first mode, operates the opening and closing driving source 145. As the opening and closing driving source 145 operates, the opening and closing pinion 146 and the opening and closing rack 147 are driven. The opening and closing rack 147 moves the opening and closing member 141 upward to open the discharge opening 131.

Accordingly, the purified air introduced into the discharge device 100 may be discharged through the discharge opening 131.

Referring to FIGS. 1, 2 and 5, the air purifier 1 may operate in the second mode in which purified air is discharged through the second discharge portion 122.

In detail, the controller 15, in response to receiving a command for operating the air purifier 1 in the second mode, operates the opening and closing drive source 145 to close the discharge opening 131. When the discharge opening 131 is in a closed state, the controller 15 does not operate the opening and closing driving source 145. As the discharge opening 131 is closed, the air purifier 1 may allow the purified air introduced into the discharge device 100 to be discharged through the second discharge portion 122. Since the second discharge portion 122 is composed of a plurality of discharge holes H having a fine size, air discharged through the second discharge portion 122 may be discharged at a low speed.

Referring to FIGS. 6 and 7, the air purifier 1 may operate in the third mode in which the purified air is discharged through the second discharge portion 122 and the first discharge portion 112. That is, the air purifier 1 may discharge air in a state in which an air discharging area of the discharge device 100 is increased compared to the second mode.

In detail, the controller 15, in response to receiving a command for operating the air purifier 1 in the third mode, operates the first driving source 125. As the first driving source 125 is driven, the first pinion 126 and the first rack 127 are driven. Accordingly, the second case 120 moves in a direction away from the main body 10. The first discharge portion 112 of the first case 110 is exposed to the outside. The air discharging area of the discharge device 100 may be increased in an amount moved by the second case 120.

Figure 8:
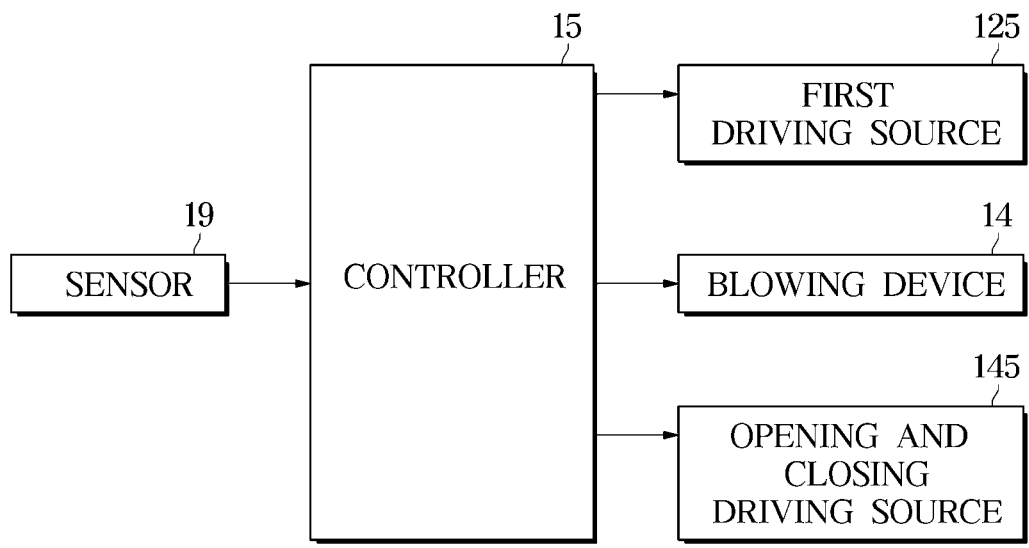
FIG. 8 is a control block diagram of the air purifier shown in FIG. 1.

FIG. 8 is a control block diagram of the air purifier shown in FIG. 1.

Various control methods of the air purifier 1 according to the embodiment of the disclosure will be described with reference to FIG. 8.

The air purifier 1 according to the embodiment of the disclosure may include a sensor 19. The sensor 19 may be provided to detect various surrounding environments, and may transmit the detected information to the controller 15. The controller 15 may control the operation mode of the air purifier 1 on the basis of information received from the sensor 19.

In detail, the sensor 19 may measure the ambient temperature of the air purifier 1. In response to the temperature measured by the sensor 19 being lower than or equal to a predetermined value, the controller 15 may move the second case 120 in a direction away from the main body 10 to increase the areas of the discharge portions 112 and 122 of the discharge device 100. In response to the temperature measured by the sensor 19 being higher than the predetermined value, the controller 15 may move the second case 120 in a direction toward the main body 10 to decrease the areas of the discharge portions 112 and 122 of the discharge device 100. Accordingly, when the surroundings are relatively cold, the air purifier 1 may increase the amount of air discharged through the plurality of discharge holes H having a fine size so as to minimize a cold draft.

In this case, the air purifier 1 may also adjust the rotation speed of the blowing device 14. In detail, when the ambient temperature of the air purifier 1 is relatively low, the controller 15 may increase the areas of the discharge portions 112 and 122 while maintaining the rotational speed of the blowing device 14 to decrease the flow rate of the discharged air. When the ambient temperature of the air purifier 1 is relatively low, the controller 15 may maintain the areas of the discharge portions 112 and 122 while decreasing the rotational speed of the blowing device 14. When the ambient temperature of the air purifier 1 is relatively low, the controller 15 may increase the areas of the discharge portions 112 and 122 while decreasing the rotational speed of the blowing device 14, to decrease the flow rate of the discharged air and reduce noise.

In addition, the sensor 19 may measure the ambient illuminance of the air purifier 1. In response to the illuminance measured by the sensor 19 being lower than or equal to a predetermined value, the controller 15 may move the second case 120 in a direction toward the main body 10 to reduce the areas of the discharge portions 112 and 122 of the discharge device 100. In response to the illuminance measured by the sensor 19 being higher than the predetermined value, the controller 15 may move the second case 120 in a direction away from the main body 10 to increase the areas of discharge portions 112 and 122 of the discharge device 100. Accordingly, when the surroundings are relatively dark, the air purifier 1 may reduce the amount of air discharged through the plurality of discharge holes H having a fine size.

In this case, the air purifier 1 may also adjust the rotation speed of the blowing device 14. In detail, when the ambient illuminance of the air purifier 1 is relatively high, the controller 15 may increase the areas of the discharge portions 112 and 122 while maintaining the rotational speed of the blowing 14 to thereby decrease the flow rate of the discharged air. When the ambient illuminance of the air purifier 1 is relatively high, the controller 15 may maintain the areas of the discharge portions 112 and 122 while decreasing the rotational speed of the blowing device 14. When the ambient illuminance of the air purifier 1 is relatively high, the controller 15 may increase the areas of the discharge portions 112 and 122 while decreasing the rotational speed of the blowing device 14 to thereby decrease the flow rate of the discharged air and reduce noise.

In addition, the sensor 19 may measure the current consumption of the air purifier 1. In response to the current consumption measured by the sensor 19 being lower than or equal to a predetermined value, the controller 15 may operate the opening and closing device 140 to open the discharge opening 131 to operate the air purifier 1 in the first mode. In response to the current consumption measured by the sensor 19 being higher than the predetermined value, the controller 15 may close the discharge opening 131 and control the air purifier 1 to operate in one of the second to fourth modes in which air is discharged at a low speed through the discharge portions 112 and 122. Accordingly, the air purifier 1 may reduce the energy consumption by increasing the amount of air discharged through the plurality of discharge holes H having a fine size when the consumption of current is relatively large.

In this case, the air purifier 1 may also adjust the rotation speed of the blowing device 14. In detail, when the current consumption of the air purifier 1 is relatively large, the controller 15 may increase the areas of the discharge portions 112 and 122 while maintaining the rotational speed of the blowing device 14 to decrease the flow rate of the discharged air. When the current consumption of the air purifier 1 is relatively large, the controller 15 may decrease the rotational speed of the blowing device 14 and maintain the areas of the discharge portions 112 and 122. When the current consumption of the air purifier 1 is relatively large, the controller 15 may decrease the rotational speed of the blowing device 14 while increasing the areas of the discharge portions 112 and 122 to decrease the flow rate of the discharged air while reducing noise.

In addition, the sensor 19 may include an infrared sensor to detect a moving object around the air purifier 1. In response to an object detected by the sensor 19 being larger than a predetermined size, the controller 15 may operate the opening and closing device 140 to open the discharge opening 131 to operate the air purifier 1 in the first mode. In response to an object (e.g., a child) detected by the sensor 19 being smaller than or equal to the predetermined size, the controller 15 may close the discharge opening 131 and control the air purifier 1 to operate in one of the second to fourth modes in which air is discharged at a low speed through the discharge portions 112 and 122. Accordingly, the air purifier 1 may prevent the discharged air from coming into direct contact with an object (e.g., a child) having a relatively small size. In addition, the air purifier 1 may prevent foreign substances from being introduced into the discharge opening 131, which is a relatively large hole, by an object (e.g., a child) having a relatively small size.

In this case, the air purifier 1 may also adjust the rotation speed of the blowing device 14. In detail, when a relatively small object is detected around the air purifier 1, the controller 15 may increase the areas of the discharge portions 112 and 122 while maintaining the rotational speed of the blowing device 14 to decrease the flow rate of the discharged air. When a relatively small object is sensed around the air purifier 1, the controller 15 may maintain the areas of the discharge portions 112 and 122 while decreasing the rotational speeds of the blowing device 14. When a relatively small object is detected around the air purifier 1, the controller 15 may increase the areas of the discharge portions 112 and 122 while decreasing the rotational speed of the blowing device 14 to thereby decrease the flow rate of the discharged air while reducing noise.

In addition, the sensor 19 may measure the amount of carbon dioxide around the air purifier 1. In response to the amount of carbon dioxide measured by the sensor 19 being lower than or equal to a predetermined value, the controller 15 may close the discharge opening 131 and control the air purifier 1 to operate in one of the second to fourth modes in which air is discharged at a low speed through the discharge portions 112 and 122. In response to the amount of carbon dioxide measured by the sensor 19 being higher than the predetermined value, the controller 15 may open the discharge opening 131 to operate the air purifier 1 in the first mode. Accordingly, the air purifier 1 may automatically control the amount of inflow or ventilation of the external air.

In this case, the air purifier 1 may also adjust the rotation speed of the blowing device 14. In detail, when the amount of carbon dioxide around the air purifier 1 is relatively small, the controller 15 may increase the areas of the discharge portions 112 and 122 while maintaining the rotational speed of the blowing device 14 to decrease the flow rate of the discharge air. When the amount of carbon dioxide around the air purifier 1 is relatively small, the controller 15 may decrease the rotational speed of the blowing device 14 while maintaining the areas of the discharge portions 112 and 122. When the amount of carbon dioxide around the air purifier 1 is relatively small, the controller 15 may decrease the rotational speed of the blowing device 14 and increase the areas of the discharge portions 112 and 122 to decrease the flow rate of the discharged air and reduce noise.

In addition, the sensor 19 may measure the concentration of smoke caused by a fire around the air purifier 1. In response to the concentration of smoke measured by the sensor 19 being higher than a predetermined value, the controller 15 may close the discharge opening 131 and operate the air purifier 1 to operate in one of the second to fourth modes in which air is discharged at a low speed through the discharge portions 112 and 122. In response to the concentration of smoke measured by the sensor 19 being lower than or equal to the predetermined value, the controller 15 may open the discharge opening 131 to operate the air purifier 1 in the first mode. Accordingly, the air purifier 1 may delay the time taken for the smoke of fire to enter the interior.

In this case, the air purifier 1 may also adjust the rotation speed of the blowing device 14. In detail, when the concentration of fire smoke around the air purifier 1 is relatively high, the controller 15 may increase the areas of the discharge portions 112 and 122 while maintaining the rotational speed of the blowing device 14 to decrease the flow rat of the discharged air. When the concentration of the fire smoke around the air purifier 1 is relatively high, the controller 15 may decrease the rotational speed of the blowing device 14 and maintain the areas of the discharge portions 112 and 122. When the concentration of fire smoke around the air purifier 1 is relatively high, the controller 15 may decrease the rotational speed of the blowing device 14 and increase the areas of the discharge portions 112 and 122 to decrease the flow rate of the discharged air and reduce noise.

In addition, the sensor 19 may measure the pressure around the air purifier 1. In response to the pressure measured by the sensor 19 being higher than a predetermined value, the controller 15 may close the discharge opening 131 and operate the air purifier 1 in one of the second to fourth modes in which air is discharged at a low speed through the discharge portions 112 and 122. In response to the pressure measured by the sensor 19 being lower than or equal to the predetermined value, the controller 15 may open the discharge opening 131 to operate the air purifier 1 in the first mode. Accordingly, when the air purifier 1 is disposed in the kitchen, the efficiency of the kitchen hood may be enhanced.

In this case, the air purifier 1 may also adjust the rotation speed of the blowing device 14. In detail, when the pressure around the air purifier 1 is relatively high, the controller 15 may increase the areas of the discharge portions 112 and 122 while maintaining the rotational speed of the blowing device 14 to decrease the flow rate of discharged air. When the pressure around the air purifier 1 is relatively high, the controller 15 may decrease the rotational speed of the blowing device 14 and maintain the areas of the discharge portions 112 and 122. When the pressure around the air purifier 1 is relatively high, the controller 15 may decrease the rotational speed of the blowing device 14 and increase the areas of the discharge portions 112 and 122 to decrease the flow rate of the discharged air and reduce noise.

In addition, the sensor 19 may measure the amount of dust around the air purifier 1. In response to the amount of dust measured by the sensor 19 being lower than or equal to a predetermined value, the controller 15 may close the discharge opening 131 and operate the air purifier 1 in one of the second to fourth modes in which air is discharged at a low speed through the discharge portions 112 and 122. In response to the amount of dust measured by the sensor 19 being higher than the predetermined value, the controller 15 may open the discharge opening 131 to operate the air purifier 1 in the first mode. Accordingly, the air purifier 1 may increase the amount of air being purified, when the amount of dust around the air purifier 1 is relatively large.

In this case, the air purifier 1 may also adjust the rotation speed of the blowing device 14. In detail, when the amount of dust around the air purifier 1 is relatively small, the controller 15 may increase the areas of the discharge portions 112 and 122 while maintaining the rotational speed of the blowing device 14 to decrease the flow rate of discharged air. When the amount of dust around the air purifier 1 is relatively small, the controller 15 may decrease the rotational speed of the blowing device 14 and maintain the areas of the discharge portions 112 and 122. When the amount of dust around the air purifier 1 is relatively small, the controller 15 may decrease the rotational speed of the blowing device 14 and increase the areas of the discharge portions 112 and 122 to increase the flow rate of the discharged air and reduce noise.

In addition, the sensor 19 may measure the humidity around the air purifier 1. In response to the humidity measured by the sensor 19 being higher than a predetermined value, the controller 15 may close the discharge opening 131 and operate the air purifier 1 in one of the second to fourth modes in which air is discharged at a low speed through the discharge portions 112 and 122. In response to the humidity measured by the sensor 19 being lower than or equal to the predetermined value, the controller 15 may open the discharge opening 131 to operate the air purifier 1 in the first mode. Accordingly, the air purifier 1 may measure the humidity and the amount of dust separately, to prevent inefficient driving of the air purifier 1.

In this case, the air purifier 1 may also adjust the rotation speed of the blowing device 14. In detail, when the ambient humidity of the air purifier 1 is relatively high, the controller 15 may increase the areas of the discharge portions 112 and 122 while maintaining the rotational speed of the blowing device 14 to decrease the flow rate of discharged air. When the ambient humidity of the air purifier 1 is relatively high, the controller 15 may decrease the rotational speed of the blowing device 14 and maintain the areas of the discharge portions 112 and 122. When the ambient humidity of the air purifier 1 is relatively high, the controller 15 may decrease the rotational speed of the blowing device 14 and increase the areas of the discharge portions 112 and 122 to decrease the flow rate of the discharged air and reduce noise.

Figure 9:
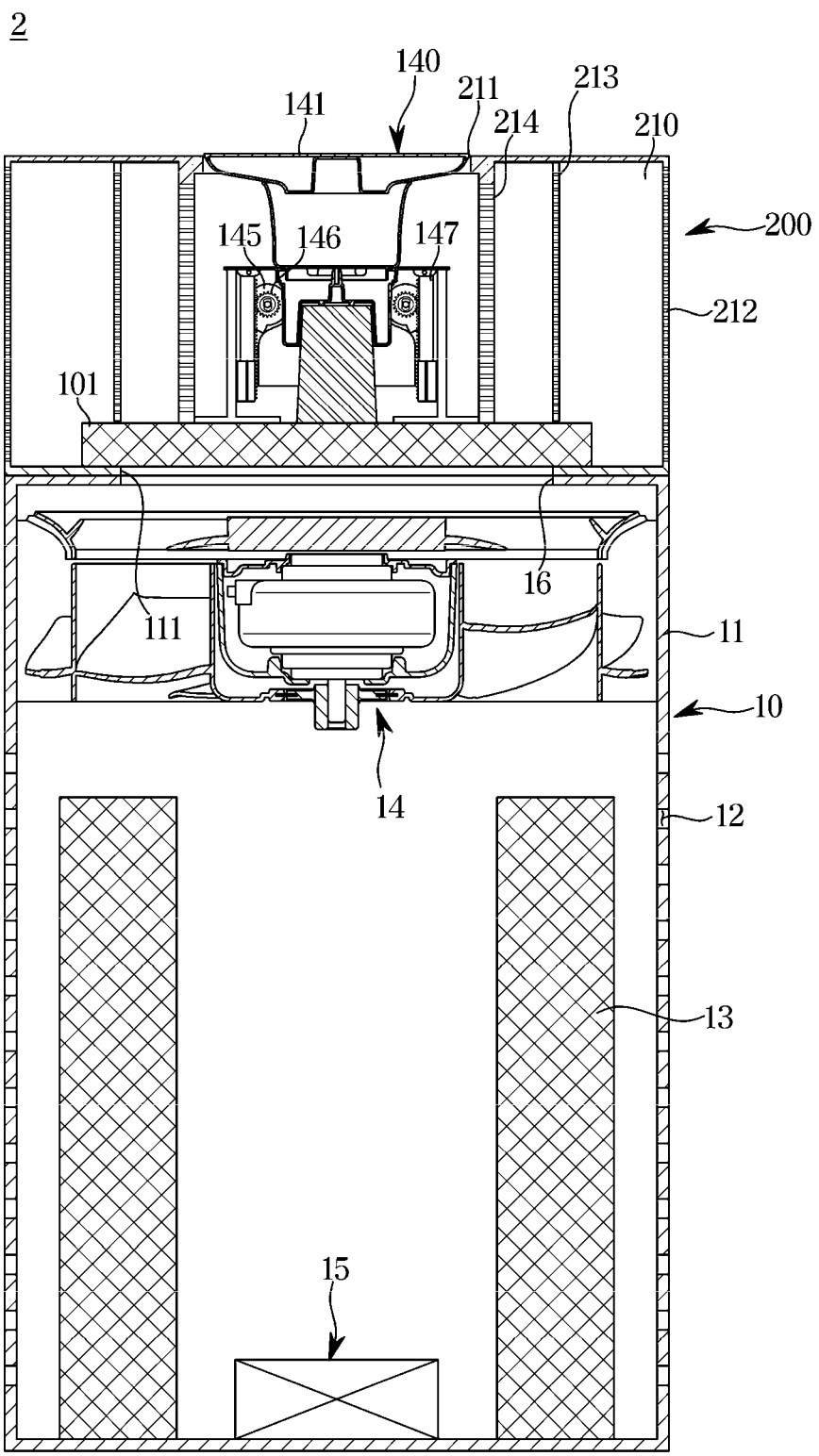
FIG. 9 is a view illustrating a cross-section of an air purifier according to another embodiment of the disclosure.

FIG. 9 is a view illustrating a cross-section of an air purifier according to another embodiment of the disclosure.

An air purifier 2 according to another embodiment of the disclosure will be described with reference to FIG. 9. The same reference numerals are assigned to the same configurations as those of the embodiment described with reference to FIGS. 1 to 8, and detailed description thereof may be omitted.

Referring to FIG. 9, a discharge device 200 of the air purifier 2 according to the embodiment of the disclosure includes discharge case 210 including a first case 110 and a second case 120, which are the same as those shown in FIGS. 1 to 8 but are integrally formed with each other. That is, the discharge device 200 according to the embodiment of the disclosure may include the discharge case 210 and an opening and closing device 140.

The discharge case 210 may be fixed to the main body 10. The discharge case 210 may form a bottom surface, a side surface, and an upper surface of the discharge device 200.

The discharge case 210 may include a discharge portion 212. The discharge portion 212 may include a plurality of discharge holes having a fine size. The discharge portion 212 may be provided to discharge air when the air purifier 2 operates in the second mode.

The discharge case 210 may include a discharge opening 211. The discharge opening 211 may be disposed in a part of the discharge case 210 forming an upper surface of the air purifier 2. The discharge opening 211 may be provided to discharge air when the air purifier 2 operates in the first mode. The discharge opening 211 may be opened and closed by the opening and closing device 140.

The discharge case 210 may include a first passage portion 213. The first passage portion 213 may be provided to pass air introduced into the discharge device 200 and discharged through the discharge portion 212. The first passage portion 213 may include a plurality of holes.

The discharge case 210 may include a second passage portion 214. The second passage portion 214 may be provided to pass air introduced into the discharge device 200 and discharged through the discharge opening 211. The second passage portion 214 may include a plurality of holes.

The first passage portion 213 and the second passage portion 214 may be omitted.

With such a configuration, the air purifier 2 according to the embodiment of the disclosure may operate in the first mode for discharging air through the discharge opening 211 and the second mode for discharging air through the discharge portion 212.

Figure 10:
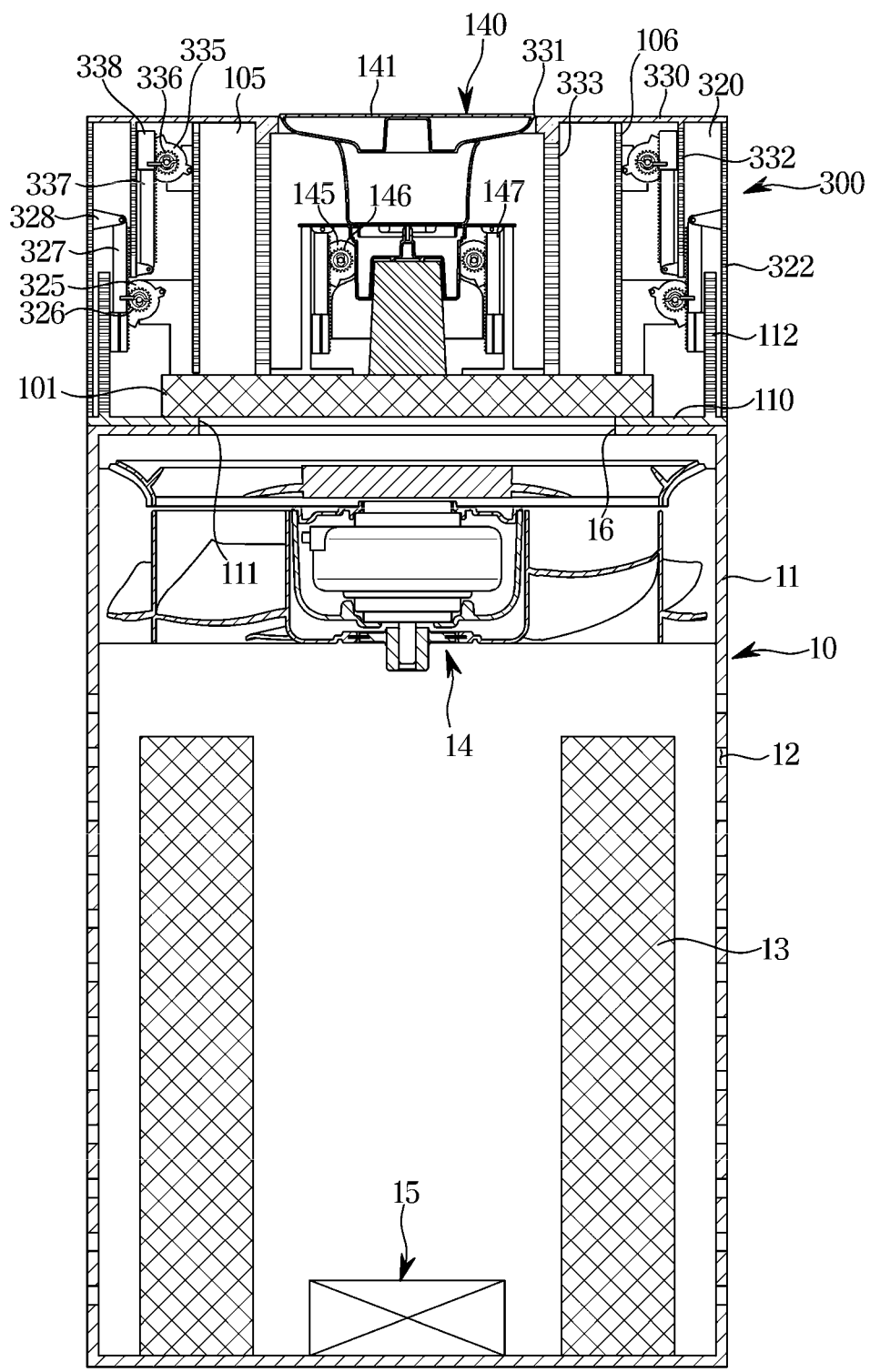
FIG. 10 is a view illustrating a cross-section of an air purifier according to another embodiment of the disclosure.
Figure 11:
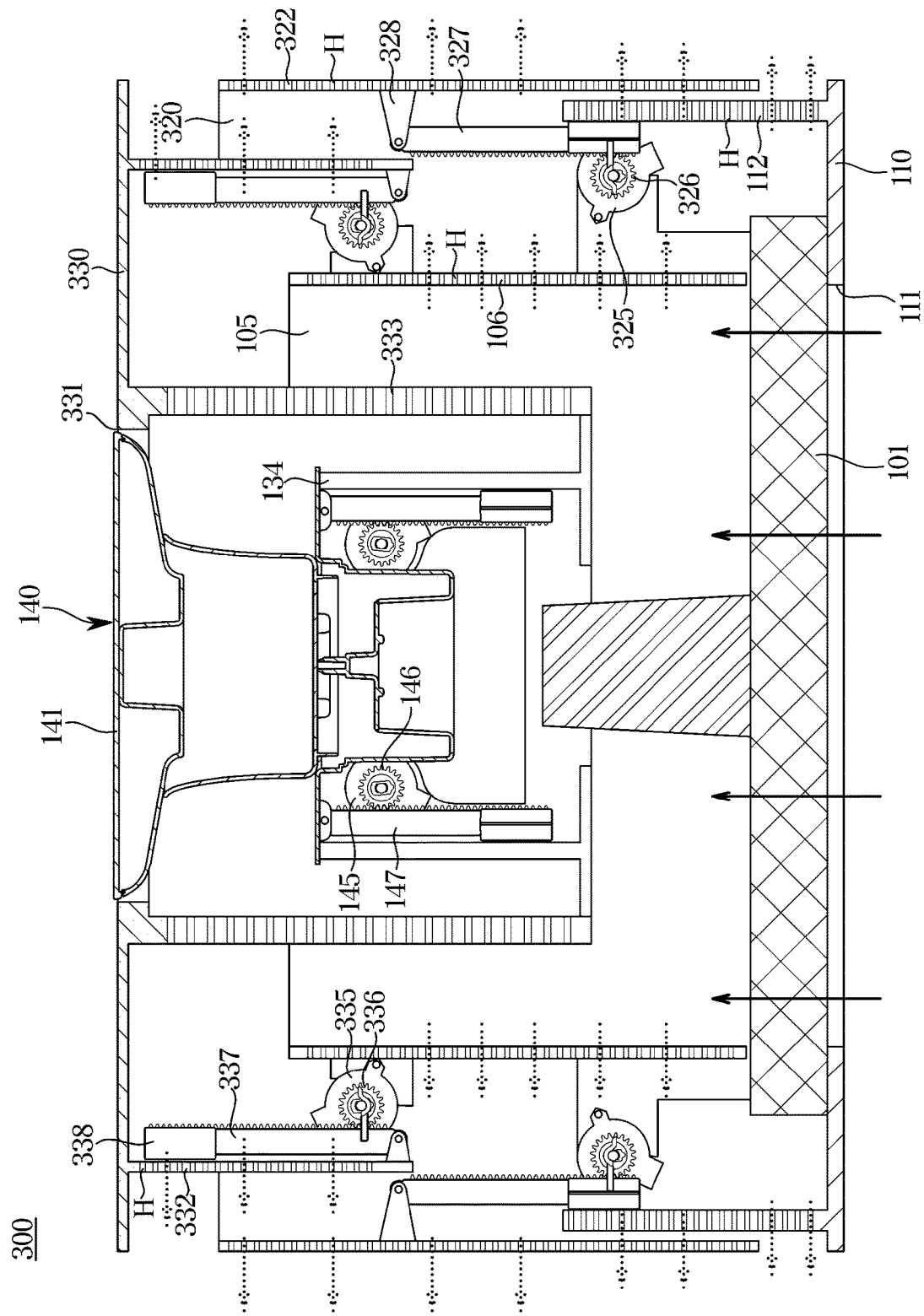
FIG. 11 is a cross-sectional view illustrating a state in which the air purifier shown in FIG. 10 operates in the fourth mode.

FIG. 10 is a view illustrating a cross-section of an air purifier according to another embodiment of the disclosure. FIG. 11 is a cross-sectional view illustrating a state in which the air purifier shown in FIG. 10 operates in a fourth mode.

An air purifier 3 according to another embodiment of the disclosure will be described with reference to FIGS. 10 to 12. The same reference numerals are assigned to the same configurations as those of the embodiment described with reference to FIGS. 1 to 8, and detailed description thereof may be omitted.

Referring to FIG. 10, a discharge device 300 of the air purifier 3 according to the embodiment of the disclosure may include a second case 120 which is the same as that shown in FIGS. 1 to 8 but is divided into two components. That is, the discharge device 300 may include a first case 110, a second case 320, and a third case 330.

The second case 320 may form a side surface of the discharge device 300, and the third case 330 may form an upper surface of the discharge device 300.

The second case 320 may include a second discharge portion 322. The discharge device 300 may include first driving device 325, 326, 327, and 328 for driving the second case 320. The first driving devices 325, 326, 327, and 328 may include a first driving source 325, a first pinion 326, a first rack 327, and a first fixing part 328. The first driving devices 325, 326, 327, and 328 may be provided in plural.

The third case 330 may be provided to be movable with respect to the second case 320. The third case 330 may include a discharge opening 331, a third discharge portion 332, and a second passage portion 333. Here, the second passage portion 333 may be omitted, and a portion in which the second passage portion 333 is formed may be provided as a plate having no opening.

The third discharge portion 332 may include a plurality of discharge holes having a fine size. The third discharge portion 332 may be provided to discharge air when the air purifier 3 operates in the fourth mode. The third discharge portion 332 may be provided to face a lateral side. The third discharge portion 332 may be formed on all of the front, rear, left, and right sides of the third case 330. The third discharge portion 332 may be exposed to the outside according to the operation mode of the air purifier 3.

The discharge device 300 may include second driving devices 335, 336, 337, and 338 for driving the third case 330. The second driving devices 335, 336, 337, and 338 may include a second driving source 335, a second pinion 336, a second rack 337, and a second fixing part 338. The second driving devices 335, 336, 337, and 338 may be provided in plural.

The second driving source 335 may be fixed to the fixed case 105. The second pinion 336 may be connected to the second driving source 335. The second pinion 336 may receive power from the second driving source 335. The second rack 337 may receive power from the second pinion 337. The second rack 337 may be fixed to the second fixing part 338. The second fixing part 338 may be fixed to the third case 330. With such a configuration, the third case 330 may be moved based on the driving of the second driving source 335.

The first passage portion 106 may be located at an inside of the third discharge portion 332.

The opening and closing device 140 may be provided to be movable with respect to the third case 330.

Figure 12:
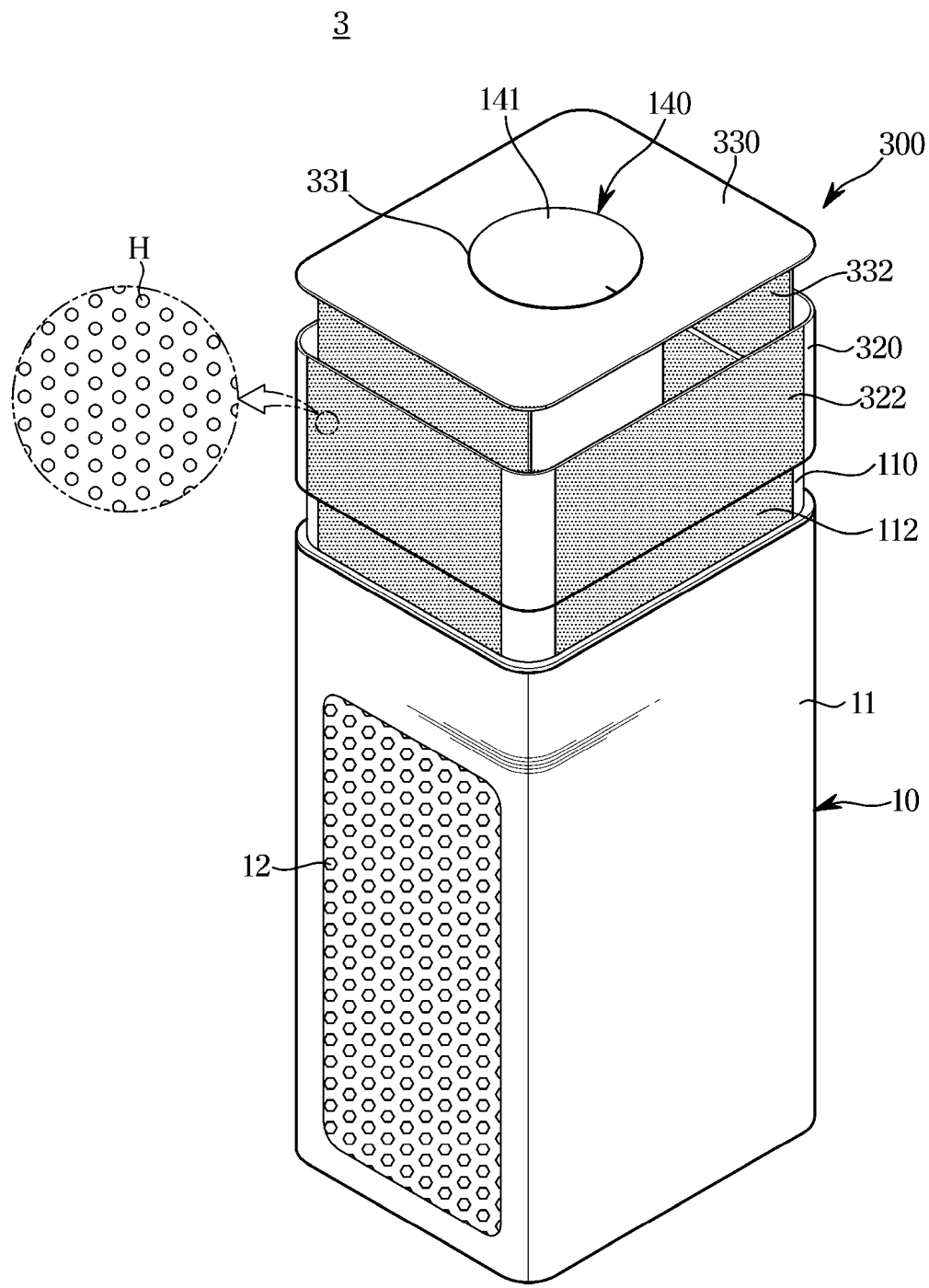
FIG. 12 is a perspective view illustrating the air purifier shown in FIG. 11.

The air purifier 3 may operate in one of the first to third modes of the embodiment shown in FIGS. 1 to 8, and may further operate as shown in FIGS. 11 and 12 in the fourth mode in which purified air is discharged through the second discharge portion 322, the first discharge portion 112, and the third discharge portion 332. That is, the air purifier 3 may discharge air in a state in which the air discharging area of the discharge device 300 is increased compared to the third mode.

In detail, while the air purifier 3 is operating in the third mode, the controller 15 may be configured to, in response to receiving a command for operating the air purifier 3 in the fourth mode, operate the second driving source 335. As the second driving source 335 is driven, the second pinion 336 and the second rack 337 are driven. Accordingly, the third case 330 moves in a direction away from the main body 10. The third discharge portion 332 of the third case 330 is exposed to the outside. The air discharging area of the discharge device 300 may be increase in an amount moved by the third case 330.

Figure 13:
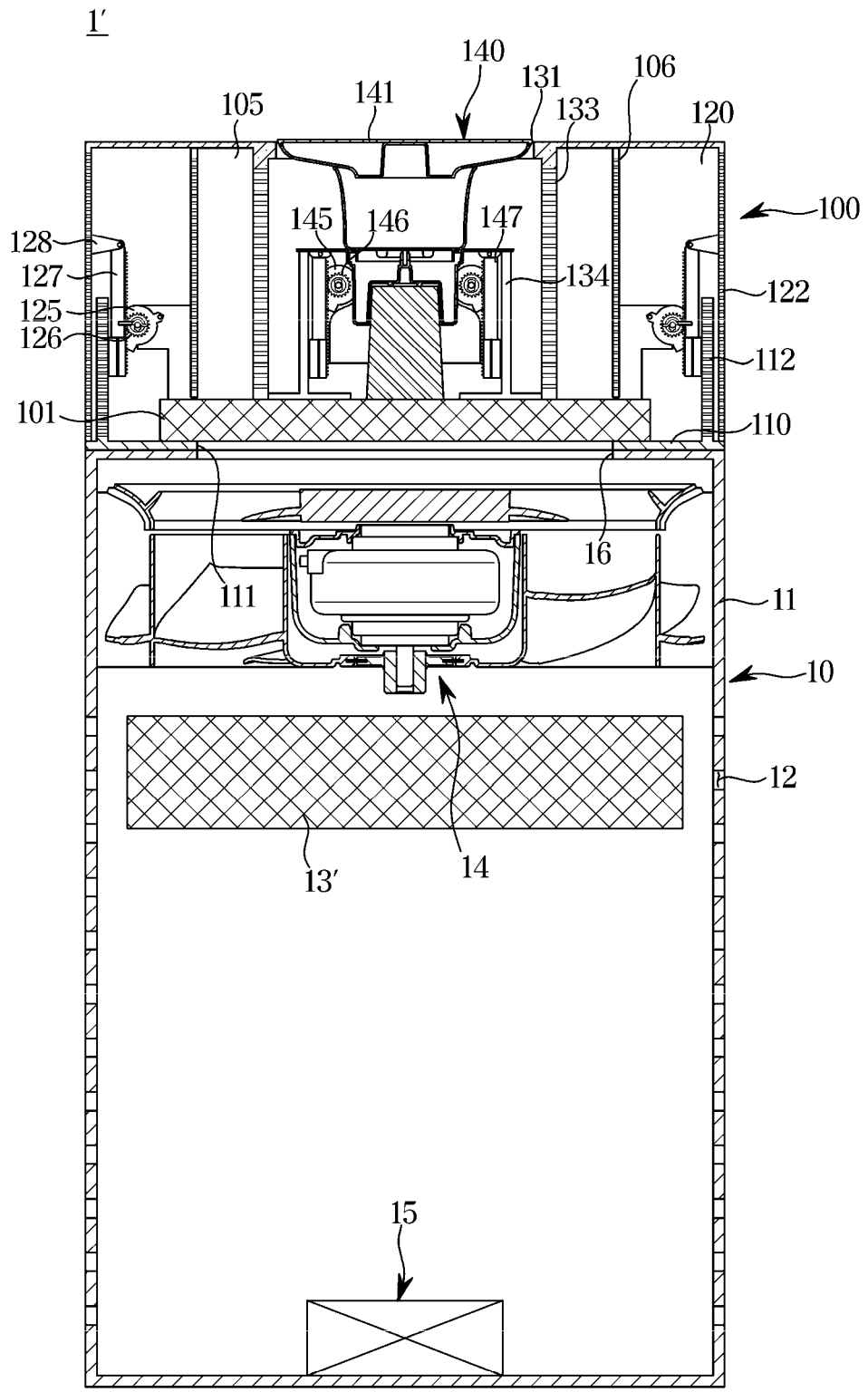
FIG. 13 is a view illustrating a cross section of an air purifier according to another embodiment of the disclosure.

FIG. 13 is a view illustrating a cross section of an air purifier according to another embodiment of the disclosure.

An air purifier 1' according to another embodiment of the disclosure will be described with reference to FIG. 13. In the description of the air purifier 1', the same reference numerals are assigned to the same configurations as those of the air purifier 1 according to the embodiment described with reference to FIGS. 1 to 8, and detailed description thereof may be omitted.

Referring to FIG. 13, a main body filter 13' may be disposed inside the housing 11 of the air purifier 1'. The main body filter 13' may be disposed to filter air introduced through the inlet 12. The main body filter 13' may be disposed below the blowing device 14.

Unlike the main body filter 13 disposed to extend in an approximately vertical direction as shown in FIG. 2, the main body filter 13' shown in FIG. 13 may be disposed to extend in an approximately horizontal direction. Unlike the main body filter 13 provided to correspond to the inlet 12 as shown in FIG. 2, the main filter 13' shown in FIG. 13 may be provided to correspond to the blowing device 14. Unlike the main body filter 13 provided in two units as shown in FIG. 2, the main body filter 13' shown in FIG. 13 is provided in one unit. With such a configuration, the air purifier 1' shown in FIG. 13 may be provided to allow all of the air introduced through the inlets 12 formed at the front and the rear surfaces to pass through the main body filter 13'.

Figure 14:
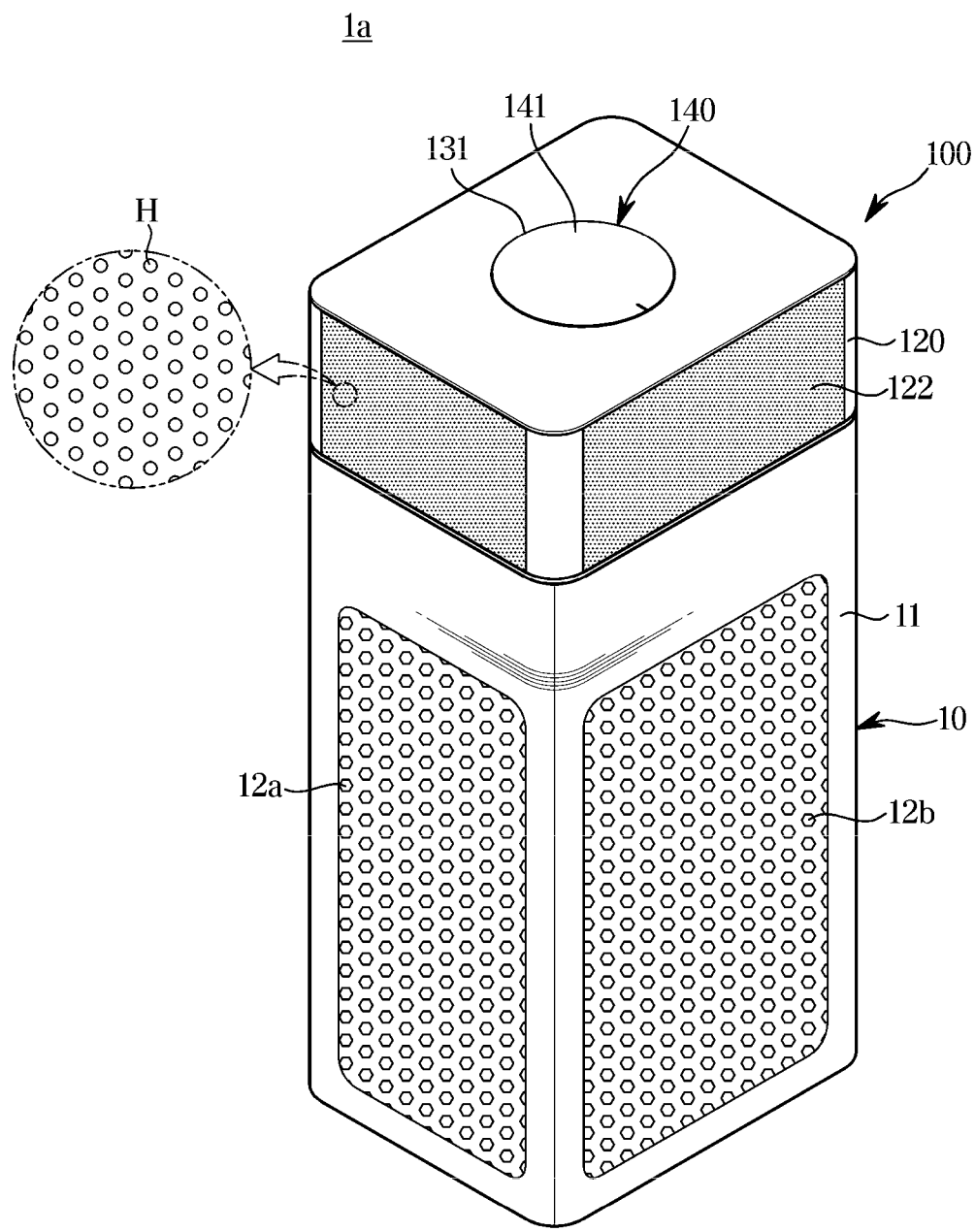
FIG. 14 is a view illustrating an air purifier according to another embodiment of the disclosure.
Figure 15:
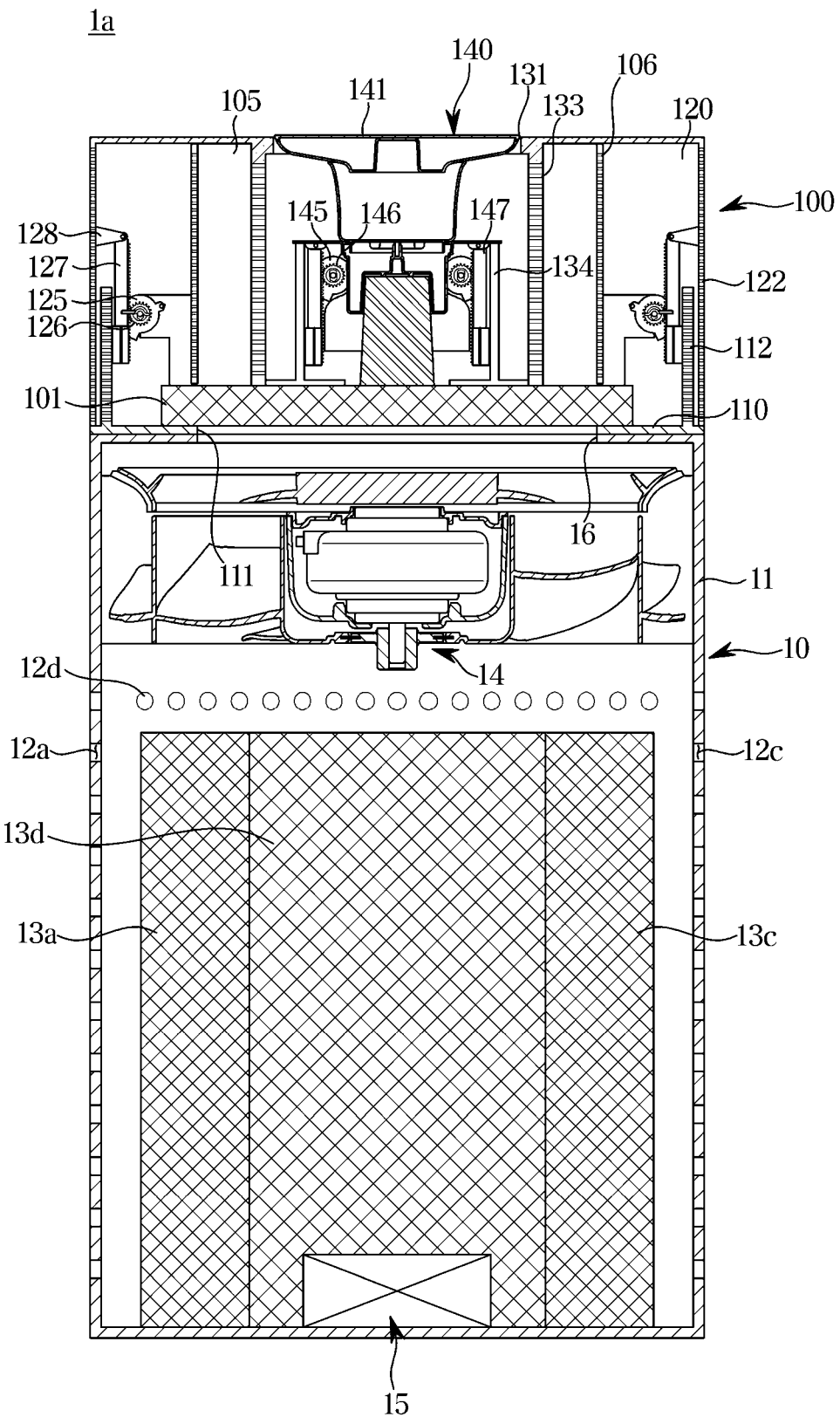
FIG. 15 is a view illustrating a cross-section of the air purifier shown in FIG. 14.

FIG. 14 is a view illustrating an air purifier according to another embodiment of the disclosure. FIG. 15 is a view illustrating a cross-section of the air purifier shown in FIG. 14.

An air purifier 1a according to another embodiment of the disclosure will be described with reference to FIGS. 14 and 15. In the following description of the air conditioner 1a, the same reference numerals are assigned to the same configurations as those of the air purifier 1a of the embodiment described with reference to FIGS. 1 to 8, and detailed description thereof may be omitted.

Referring to FIGS. 14 and 15, the air purifier 1a may include inlets 12a, 12b, 12c, and 12d respectively formed on four surfaces of the housing 11. That is, the air purifier 1 shown in FIGS. 1 to 2 include the inlets 12 formed only on opposite sides of the housing 11, while the air purifier 1a shown in FIGS. 14 and 15 may include the inlets 12a, 12b, 12c, and 12d formed on all four sides of the housing 11.

The air purifier 1a may include main body filters 13a, 13c, and 13d provided to correspond to the inlets 12a, 12b, 12c, and 12d.

In detail, the first main body filter 13a may be provided to correspond to the first inlet 12a, the second main body filter (not shown) may be provided to correspond to the second inlet 12b, and the third main body filter 13c may be provided to correspond to the third inlet 12c, and the fourth main body filter 13d may be provided to correspond to the fourth inlet 12d.

Figure 16:
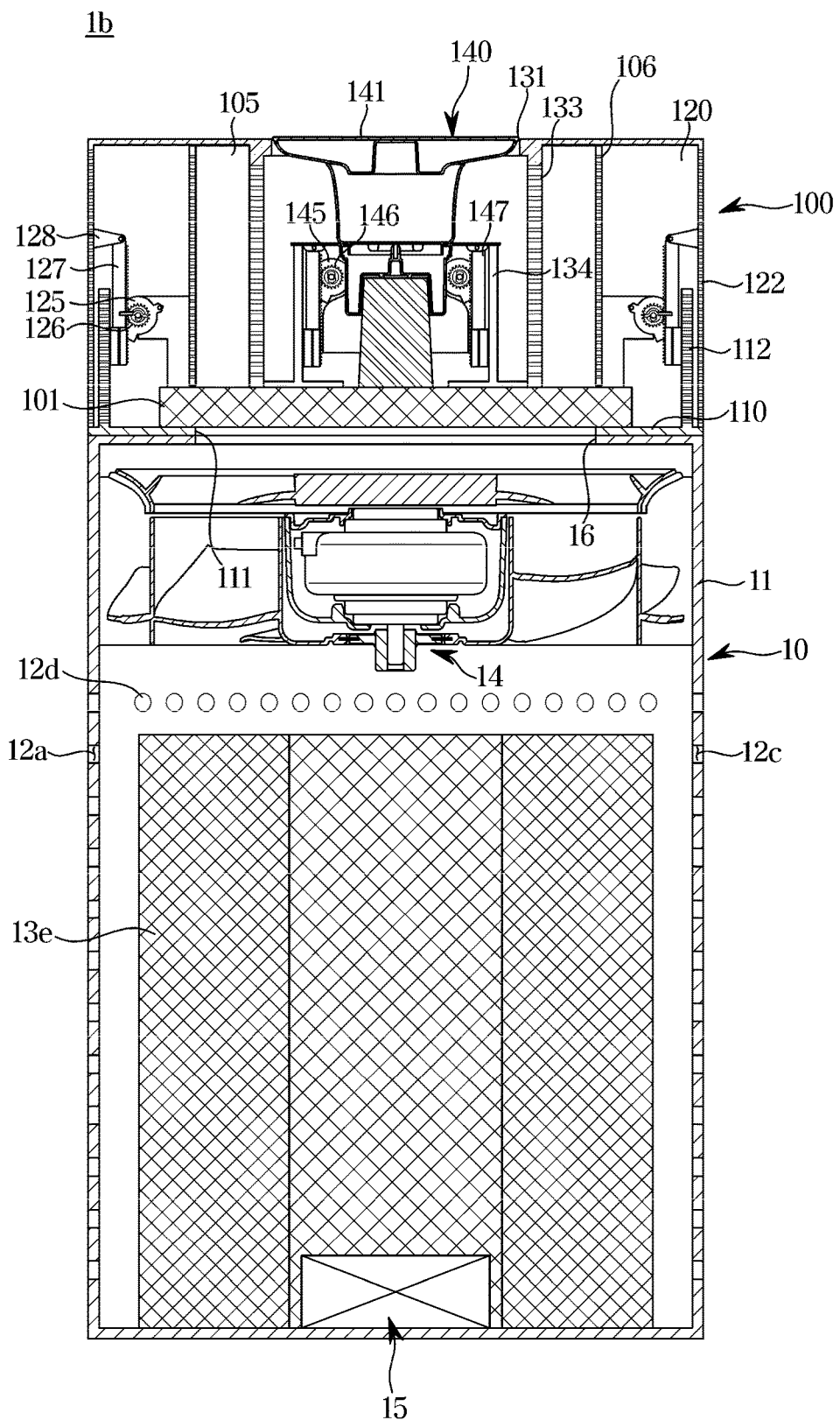
FIG. 16 is a view illustrating a cross-section of an air purifier according to another embodiment of the disclosure.

FIG. 16 is a view illustrating a cross-section of an air purifier according to another embodiment of the disclosure.

An air purifier 1b according to another embodiment of the disclosure will be described with reference to FIG. 16. In the following description of the air purifier 1b, the same reference numerals are assigned to the same configurations as those of the air purifier 1a shown in FIGS. 14 and 15, and detailed description thereof may be omitted.

Referring to FIG. 16, a main body filter 13e of the air purifier 1b may be provided in a cylindrical shape. That is, the main body filters 13a, 13c, and 13d shown in FIGS. 14 and 15 are provided to correspond to the inlets 12a, 12b, 12c, and 12d respectively formed on the four surfaces of the housing 11, while the main body filter 13e may have a single cylindrical shape capable of covering all of the inlets 12a, 12b, 12c, and 12d formed on the four surfaces of the housing 11. The inlets 12a, 12b, 12c, and 12d may be respectively located in radial outer sides of the main body filter 13e having a cylindrical shape.

Figure 17:
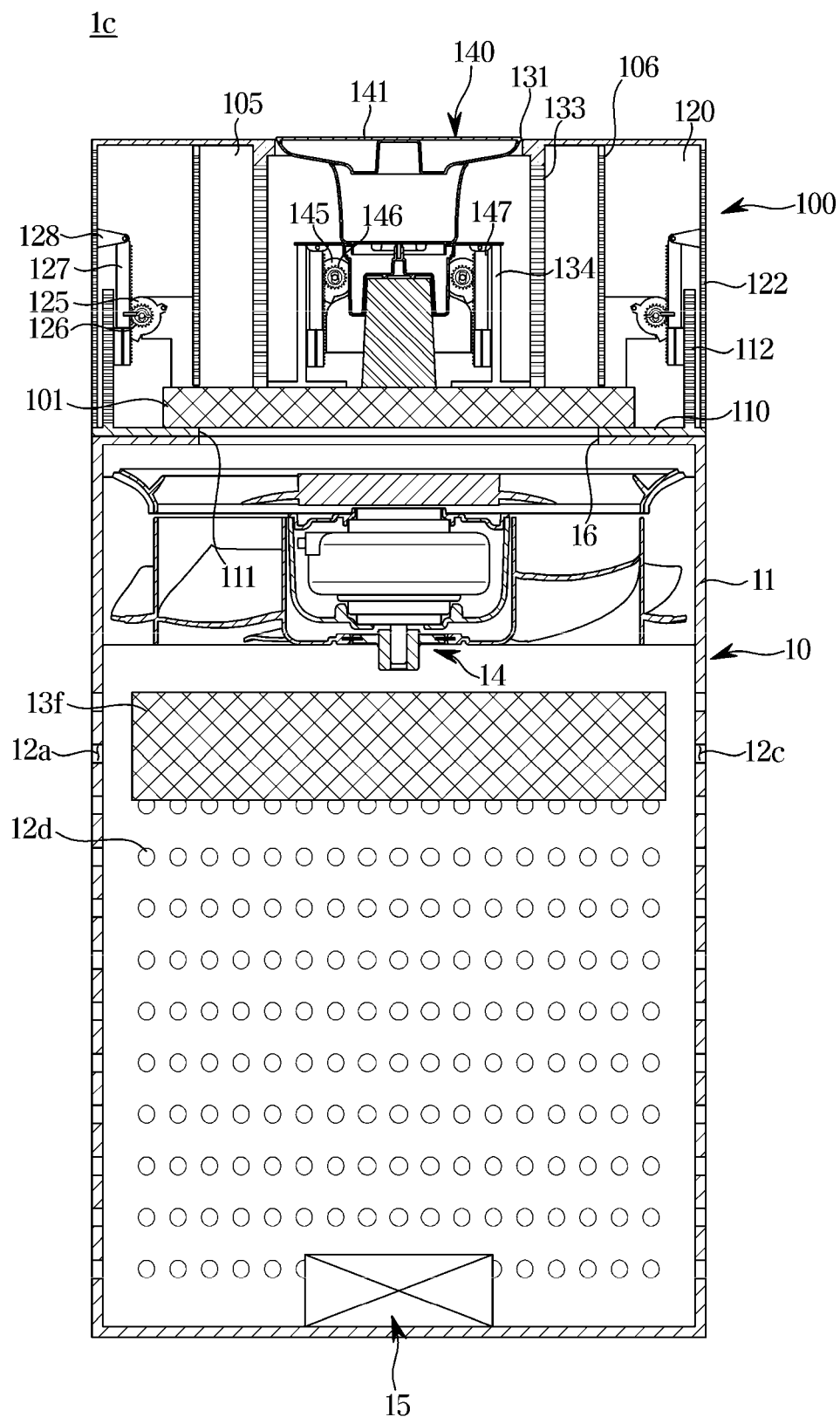
FIG. 17 is a view illustrating a cross-section of an air purifier according to another embodiment of the disclosure.

FIG. 17 is a view illustrating a cross-section of an air purifier according to another embodiment of the disclosure.

An air purifier 1c according to another embodiment of the disclosure will be described with reference to FIG. 17. The same reference numerals are assigned to the same configurations as those of the air purifier 1a shown in FIGS. 14 and 15, and detailed description thereof may be omitted.

Referring to FIG. 17, a main body filter 13f may be disposed inside the housing 11 of the air purifier 1c. The main body filter 13f may be disposed to filter air introduced through the inlets 12a, 12b, 12c, and 12d. The main body filter 13f may be disposed below the blowing device 14.

Unlike the main body filter 13a, 13c, and 13d disposed to extend in the substantially vertical direction as shown in FIGS. 14 and 15, the main body filter 13f shown in FIG. 17 may be disposed to extend in an approximately horizontal direction. Unlike the main body filters 13a, 13c, and 13d provided to correspond to the inlets 12a, 12b, 12c, and 12d as shown in FIGS. 14 and 15, the main body filter 13f shown in FIG. 17 is provided to correspond to the blowing device 14. Unlike the main body filters 13a, 13c, and 13d provided in four units as shown in FIGS. 14 and 15, the main body filter 13f shown in FIG. 17 may be provided in one unit. With such a configuration, the air purifier 1c shown in FIG. 17 is provided to allow all of the air introduced into the inlets 12a, 12b, 12c, and 12d formed on the front, rear, left and right sides to pass through the main body filter 13f.

As is apparent from the above, the air purifier can discharge purified air in various directions by a plurality of discharge holes formed on the front, rear, left and right sides of the discharge device.

The air purifier is provided to adjust the area for discharging purified air by a second discharge case of a discharge device provided to be movable with respect to a first discharge case.

Although a few embodiments of the disclosure have been shown and described, the above embodiments are for illustrative purpose only, and it would be appreciated by those skilled in the art that changes and modifications may be made in these embodiments without departing from the principles and scope of the disclosure, the scope of which is defined in the claims and their equivalents.

What is claimed is:

1. An air purifier comprising:
   a main body having an inlet; and
   a discharge device mounted on the main body and configured to receive air introduced into the main body through the inlet and discharge the air from the air purifier,
   wherein the discharge device includes:
      a discharge opening;
      a first case fixed to the main body and having a first discharge portion;
      a second case disposed to cover the first case and having a second discharge portion disposed to be opposite to the first discharge portion to cover the first discharge portion;
      an opening and closing member including a portion having a size and shape corresponding to the discharge opening, and configured to move out of the discharge opening and into the discharge opening in a vertical direction to open and close the discharge opening; and
      the first discharge portion and the second discharge portion including a plurality of discharge holes, wherein each discharge hole of the plurality of discharge holes has a size smaller than a size of the discharge opening, and wherein at least one of the first discharge portion and the second discharge portion has an air discharging area that is variable,
   wherein the second case is movable with respect to the first case in a vertical direction so that the second discharge portion is enabled to uncover a portion of the first discharge portion.

2. The air purifier of claim 1, wherein the air discharging area of the at least one of first discharge portion and the second discharge portion is varied as the second case is moved with respect to the first case.

3. The air purifier of claim 1, wherein the discharge device includes a first driving device configured to move the second case with respect to the first case.

4. The air purifier of claim 1, wherein the discharge device further includes a third case provided to be movable with respect to the second case.

5. The air purifier of claim 4, wherein the discharge device further includes a second driving device configured to move the third case with respect to the second case.

6. The air purifier of claim 1, wherein the discharge opening is provided at an upper side of the discharge device, and the is at least the first discharge portion and the second discharge portion is provided at a lateral side of the discharge device.

7. The air purifier of claim 1, wherein the discharge device includes an opening and closing driving device configured to move the opening and closing member out of the discharge opening and into the discharge opening to open and close the discharge opening.

8. The air purifier of claim 1, further comprising:
a sensor; and
a controller configured to receive a signal from the sensor and, based on the received signal, control a movement of the second case with respect to the first case and a movement of the opening and closing member with respect to the discharge opening.

9. The air purifier of claim 8, wherein the sensor is configured to measure a temperature, and
the controller is further configured to:
in response to the temperature measured by the sensor being lower than or equal to a predetermined value, control the second case to move in a direction away from the main body; and
in response to the temperature measured by the sensor being higher than the predetermined value, control the second case to move in a direction toward the main body.

10. The air purifier of claim 8, wherein the sensor is configured to measure an illuminance, and
the controller is further configured to:
in response to the illuminance measured by the sensor being higher than a predetermined value, control the second case to move in a direction away from the main body; and
in response to the illuminance measured by the sensor being lower than or equal to the predetermined value, control the second case to move in a direction toward the main body.

11. The air purifier of claim 8, wherein the sensor is configured to measure a current consumption, and
the controller is further configured to;
in response to the current consumption measured by the sensor being higher than a predetermined value, control the second case to move in a direction away from the main body; and
in response to the current consumption measured by the sensor being lower than or equal to the predetermined value, control the opening and closing member to move in a direction that the discharge opening is opened.

12. The air purifier of claim 8, wherein the sensor includes an infrared sensor configured to detect a subject, and
the controller is further configured to:
in response to the subject detected by the infrared sensor being smaller than or equal to a predetermined size, control the second case to move in a direction away from the main body; and
in response to the subject detected by the infrared sensor being larger than the predetermined size, control the second case to move in a direction that the discharge opening is opened.

13. The air purifier of claim 8, wherein the sensor is configured to measure an amount of carbon dioxide, and
the controller is further configured to:
in response to the amount of the carbon dioxide measured by the sensor being greater than a predetermined value, control the opening and closing member to move in a direction that the discharge opening is opened, and
in response to the amount of the carbon dioxide measured by the sensor being less than or equal to the predetermined value, control the opening and closing member to move in a direction that the discharge opening is closed.

14. The air purifier of claim 8, wherein the sensor is configured to measure a concentration of smoke from fire, and
the controller is further configured to:
in response to the concentration of smoke measured by the sensor being higher than a predetermined value, control the opening and closing member to move in a direction that the discharge opening is closed, and
in response to the concentration of smoke measured by the sensor being lower than or equal to the predetermined value, control the opening and closing member to move in a direction that the discharge opening is opened.

15. An air purifier comprising:
a main body having an inlet; and
a discharge device mounted on the main body and configured to receive air introduced into the main body through the inlet and discharge the air from the air purifier,
wherein the discharge device includes:
a discharge opening located at an upper side of the discharge device;
a first case fixed to the main body and having a first discharge portion including a first plurality of discharge holes, wherein each discharge hole of the first plurality of discharge holes has a size smaller than a size of the discharge opening;
a second case disposed to cover the first case, and having a second discharge portion disposed to be opposite to the first discharge portion to cover the first discharge portion and including a second plurality of discharge holes, wherein each discharge hole of the second plurality of discharge holes has a size smaller than the size of the discharge opening; and
an opening and closing member including a portion having a size and shape corresponding to the discharge opening, and configured to move out of the discharge opening and into the discharge opening in a vertical direction to open and close the discharge opening,
wherein the second case is moveable with respect to the first case in a vertical direction so that the second discharge portion to enabled to uncover a portion of the first discharge portion,
wherein at least the first discharge portion and the second discharge portion has an air discharging area that increases as the second case moves in a direction away from the first case, and decreases as the second case moves in a direction toward the first case.

16. The air purifier of claim 15, wherein the second discharge portion is provided at a lateral side of the discharge device.

17. The air purifier of claim 15, further comprising a controller configured to control a movement of the second case in relation to the first case and a movement of the opening and closing member out of the discharge opening and into the discharge opening.

18. The air purifier of claim 17, further comprising a sensor configured to measure a pressure, and
the controller is further configured to:
- in response to the pressure measured by the sensor being higher than a predetermined value, control the opening and closing member to move in a direction that the discharge opening is closed; and
- in response to the pressure measured by the sensor being lower than or equal to the predetermined value, control the opening and closing member to move in a direction that the discharge opening is opened.

19. The air purifier of claim 17, further comprising a sensor configured to measure an amount of dust, and
the controller is further configured to:
- in response to the amount of dust measured by the sensor being greater than a predetermined value, control the opening and closing member to move in a direction that the discharge opening is opened, and
- in response to the amount of dust measured by the sensor being less than or equal to the predetermined value, control the opening and closing member to move in a direction that the discharge opening is closed.

* * * * *